United States Patent [19]
Nguyen et al.

[11] Patent Number: 5,815,561
[45] Date of Patent: Sep. 29, 1998

[54] METHOD AND SYSTEM FOR PROVIDING A DEMARCATED COMMUNICATION SERVICE

[75] Inventors: Hong Nguyen, Atlanta; Nailesh B. Desai, Norcross, both of Ga.

[73] Assignee: BellSouth Corporation, Atlanta, Ga.

[21] Appl. No.: 626,247

[22] Filed: Mar. 29, 1996

[51] Int. Cl.$^6$ .................................................. H04M 15/00
[52] U.S. Cl. .................... 379/115; 379/91.01; 379/144; 379/145
[58] Field of Search ................... 379/91.01, 112–115, 379/120–121, 145, 207, 192, 144

[56] References Cited

U.S. PATENT DOCUMENTS

| | | | |
|---|---|---|---|
| 5,163,086 | 11/1992 | Ahearn et al. | 379/144 |
| 5,287,403 | 2/1994 | Atkins et al. | 379/144 |
| 5,469,497 | 11/1995 | Pierce et al. | 379/91.01 |
| 5,487,107 | 1/1996 | Atkins et al. | 379/144 |
| 5,524,145 | 6/1996 | Parker et al. | 379/207 |
| 5,621,787 | 4/1997 | McKoy et al. | 379/114 |

*Primary Examiner*—Curtis A. Kuntz
*Assistant Examiner*—Duc Nguyen
*Attorney, Agent, or Firm*—Jones & Askew, LLP

[57] ABSTRACT

The present invention is a method and system for implementing service functions in association with a communication between an originating station and a called station. A communication including identification information is received at a first network element from the originating station. A transaction is opened for use in a bi-directional exchange of messages relating to the communication between the first network element and the second network element. The communication is held at the first network element while the identification information is sent from the first network element to the second network element. The second network element determines processing instructions for implementing the service functions. The second network element then sends the processing instructions to the first network element. The transaction is then closed. In response to receiving the processing message, the first network element routes the communication for connection from the originating station to the called station. The first network element then implements the service functions in accordance with the processing instructions. In a first embodiment, the present invention provides a method and system for charging the cost of a communication a prepaid account associated with a prepaid telephone card. In a second embodiment, the present invention provides a method and system for apprising the parties to a communication of the duration of the communication while the communication is in progress.

19 Claims, 8 Drawing Sheets

NETWORK ELEMENT: ORIGINATING SSP

502. RECEIVE A REQUEST FOR A COMMUNICATION

504. IDENTIFY TRIGGER, HOLD COMMUNICATION

506. OPEN TRANSACTION (ALLOCATE MEMORY)

506. QUERY MESSAGE - INFO_ANALYZED ------------------------> NETWORK ELEMENT: SCP

510. OPEN TRANSACTION (ALLOCATE MEMORY)

512. NETWORK ELEMENT: ORIGINATING SSP <-------------------> NETWORK ELEMENT: SCP

514. PROCESS IDENTIFICATION INFORMATION
                  - ACCESS DATABASE AND
                  - DETERMINE ALLOWED DURATION

NETWORK ELEMENT: ORIGINATING SSP <------------ 516. RESPONSE MESSAGE - ANALYZE_ROUTE
                    INCLUDING CALLTIMER PARAMETER AND
                    SEND_NOTIFICATION INSTRUCTION
                    INCLUDING ECHO_DATA PARAMETER

518. CLOSE TRANSACTION (FREE MEMORY)

520. CLOSE TRANSACTION (FREE MEMORY)

522. SET TIMER TO CALLTIMER MINUS ONE

524. ISDNUP INITIAL ADDRESS MESSAGE ------------------> NETWORK ELEMENT: TERMINATING SSP

NETWORK ELEMENT: ORIGINATING SSP <--------------- 526. ISDNUP ANSWER MESSAGE
                    IF COMMUNICATION CONNECTED

528. BEGIN CALL TIMER

530. PLAY A WARNING TONE WHEN TIMER EXPIRES

532. SET TIMER TO ONE

534. DISCONNECT COMMUNICATION WHEN TIMER EXPIRES

536. UNIDIRECTIONAL MESSAGE - TERMINATION_NOTIFICATION --------> NETWORK ELEMENT: SCP
   INCLUDING ECHO_DATA PARAMETER

538. COMPUTE COST OF COMMUNICATION
                    AND UPDATE DATABASE

TIME ↓

*FIG.5*

NETWORK ELEMENT: ORIGINATING SSP

802. RECEIVE A REQUEST FOR A COMMUNICATION

804. IDENTIFY TRIGGER, HOLD COMMUNICATION

806. OPEN TRANSACTION (ALLOCATE MEMORY)

808. QUERY MESSAGE - INFO_ANALYZED ---------------------> NETWORK ELEMENT: SCP
           OR
     INFO_COLLECTED

810. OPEN TRANSACTION (ALLOCATE MEMORY)

812. PROCESS IDENTIFICATION INFORMATION
                                    - ACCESS DATABASE AND
                                    - DETERMINE DEMARCATION INTERVALS

NETWORK ELEMENT: ORIGINATING SSP <--------- 814. RESPONSE MESSAGE - ANALYZE_ROUTE
                                       INCLUDING DEMARCATION INTERVALS

816. CLOSE TRANSACTION (FREE MEMORY)

818. CLOSE TRANSACTION (FREE MEMORY)

820. SET TIMER TO DEMARCATION INTERVALS

822. ISDNUP INITIAL ADDRESS MESSAGE ------------> NETWORK ELEMENT: TERMINATING SSP

NETWORK ELEMENT: ORIGINATING SSP <--------- 824. ISDNUP ANSWER MESSAGE
                                       IF COMMUNICATION CONNECTED

826. BEGIN CALL TIMER

828. PLAY A DEMARCATION TONE WHEN
     DEMARCATION INTERVALS EXPIRE

TIME

FIG.8

METHOD AND SYSTEM FOR PROVIDING A DEMARCATED COMMUNICATION SERVICE

TECHNICAL FIELD

The present invention relates generally to telecommunications systems, and more particularly, relates to a method and system for providing duration demarcated, cost demarcated, duration limited, and cost limited communication services.

BACKGROUND OF THE INVENTION

Alexander Graham Bell did not have to pay for his famous first telephone call to Watson. The rest of us are less fortunate. As a result, many telephone callers are concerned with the cost of placing telephone calls. However, a telephone caller other than one using a pay telephone typically has no way to monitor the cost of a telephone call while the call is in progress. The caller must place the telephone call and then learn of the cost of the telephone call when the bill arrives. A telephone service subscriber, who is often paying a telephone service bill for telephone calls placed by a number of individuals, may be unpleasantly surprised when the bill arrives. As opposed to Bell's famous "Come Watson, I need you," many a subscriber has muttered something less memorable, like "Argh, these bills!" The source of the frustration felt by many subscribers arises not from the cost itself, but from the fact the cost is unknown and unknowable until the bill arrives.

In addition, certain telephone service subscribers may be concerned with the duration of a telephone call irrespective of the cost of the telephone call. For example, teenagers are notorious for placing very long telephone calls. Parents may be interested in restricting this practice. Teenagers may therefore be admonished to hang up after a certain duration. However, the teenage caller is not presently reminded when the allowed duration has expired unless, of course, the parent provides the reminder.

In certain circumstances, an unobtrusive reminder such as a beep or announcement indicating that a predefined cost has been incurred, or that a predefined duration has elapsed, may be insufficient to motivate a caller to discontinue a communication. For example, a computer operated communication may not be responsive to beeps or announcements. Similarly, a disobedient teenager or a telephone caller lacking in self control may continue to maintain a communication beyond a desired cost or duration. Therefore, it may be desirable to automatically disconnect a communication based on a predefined cost or duration.

Moreover, the ability to automatically disconnect a communication is essential to providing a prepaid account as an alternative to conventional payment methods for telephone services. A conventional payment method is not always available or convenient for a would-be caller. To place a telephone call from a conventional pay telephone, a caller needs at least a quarter, and needs a lot more change than that for anything more than a local call. To avoid the necessity of a caller having to carry around a pocketful of change, and for many other reasons, the telephone industry has developed other ways for a caller to pay for telephone services. A calling card is one such way of paying for communication service such as a telephone call. A calling card is a type of credit card issued by a telephone service provider that allows the calling card holder to charge the cost of telephone services to a credit account. A calling card is typically issued only to a telephone service subscriber and persons authorized by the subscriber. Telephone services facilitated through the use of a calling card are typically charged to the subscriber's telephone service account. Most major long distance telephone service providers presently offer calling cards to subscribers.

A calling card, however, does not facilitate the provision of telephone services in all situations. For example, a would-be caller may not have a calling card. Moreover, even if a would-be caller has a calling card, a particular pay telephone may not accept the calling card as a payment method for calls placed over the pay telephone. It is therefore advantageous for a telephone service provider to offer an alternative to a calling card, such as a prepaid telephone card, to facilitate telephone services in these and other situations.

General purpose prepaid cards are presently issued primarily by banks as alternatives to credit cards. The prepaid card holder deposits money with the issuing bank to establish a prepaid account balance. The prepaid card holder then can use the prepaid card to charge purchases against the prepaid account balance. A prepaid card works much like a bank credit card except that the cost of a purchase made with a prepaid card is deducted from a prepaid account balance, whereas the cost of a purchase made with a credit card is added to a credit account balance to be paid in the future.

A telephone service provider may sell a telephone prepaid card that a card holder can use to pay for communication services. Such a telephone prepaid card may be advantageously offered by a telephone service provider as an alternative to a calling card. A person that does not have a calling card may purchase a prepaid telephone card and use it much like a calling card. For example, a telephone service provider sells a telephone prepaid card to a card holder and thereby establishes a telephone prepaid account balance to be used by the card holder to pay for telephone services. The card holder then charges telephone services against the telephone prepaid card account balance until the balance is exhausted. From the card holder's perspective, a telephone prepaid card works much like a calling card, except that the telephone prepaid card is paid for in advance.

From a telephone service provider's perspective, telephone prepaid cards can be used to increase sales and boost profits by providing new ways to package and sell telephone service. A telephone prepaid card may serve as a service gift certificate with a variety of gift and promotional purposes. For example, a goods or service provider could purchase a large number of telephone prepaid cards having relatively small account balances and have the cards imprinted with advertising material for distribution to potential customers, such as patrons at a convention. There are many other potential uses of telephone prepaid cards that make them desirable. For example, a teenager away from home could be given a telephone prepaid card having a telephone service allowance with a fixed value. Similarly, a hotel guest could use a telephone prepaid card to place telephone calls from hotel telephones without incurring the typically steep hotel service charge.

To support a telephone prepaid card system, a telephone service provider must have a way to limit the value of the telephone service provided as a result of the use of the card to the value in the corresponding prepaid account. The balance in a prepaid account corresponding to a telephone prepaid card diminishes as telephone services are used. Eventually, the entire value of a prepaid account corresponding to a telephone prepaid card is exhausted. A prepaid account may become exhausted between uses of telephone services, for example by cash redemption of the remaining balance. In this case, if the account is exhausted, the telephone service provider does not honor the use of the corresponding card as a method of payment for telephone services.

Alternatively, a prepaid account balance may become exhausted while telephone service is being provided, for example in the middle of a long distance telephone call. Consider a card holder that uses a telephone prepaid card as a method of payment to initiate a long distance call. The telephone service provider honors the card because the corresponding account has a minimum threshold value. The card holder, however, may conduct very long communication, the cost of which far exceeds the prepaid account balance. The telephone service provider therefore needs a way to monitor the balance of the prepaid account while the communication is in progress and to disconnect the communication when the prepaid account balance is exhausted. Otherwise, a caller using a telephone prepaid card would effectively receive free telephone service after exhaustion of the prepaid account balance.

An inability to disconnect telephone services initiated with a telephone prepaid card would expose the telephone service provider to a loss of revenue through the provision of some free service with each prepaid card. An unscrupulous person learning of this loophole could initiate a telephone call using a prepaid card with a small account balance and then maintain the connection for a virtually unlimited time. Distribution of a large number of telephone prepaid cards could therefore result in the provision of a large, unknown, and unknowable amount of free telephone service. In the extreme case, a large number of free telephone prepaid card connections could consume the available capacity in the telephone service provider's system, causing the provider further damage as subsequent would-be paying customers find the circuits busy. An inability to disconnect a telephone call initiated with a telephone prepaid card would therefore effectively prohibit a telephone service provider from offering telephone prepaid cards.

Telephone service providers have a need for efficient methods and systems for providing sophisticated telephone services such as those described above. Intelligent telephone service handling platforms are generally required to maintain databases and implement algorithms required to provide sophisticated telephone services. Conventional intelligent telephone service handling platforms capable of providing sophisticated telephone services such as pay telephone services have been in use for many years. These conventional systems typically require a voice channel communication (i.e., a communication using a voice channel or "trunk circuit") to be routed from an originating station to the intelligent platform, and then from the intelligent platform to the called station. These conventional systems thus rely on "double-trunked" voice channel telephone circuits to complete a communication requiring the use of an intelligent telephone service handling platform. For example, in a typical regional telephone system, a single redundant pair of intelligent telephone service handling platforms may implement a particular telephone service requiring specialized call handling for the entire system. Therefore, a telephone call originating in Birmingham, and placed to a called party in Birmingham, may be routed through an intelligent platform in Atlanta. Thus, a double trunked voice channel circuit—Birmingham-to-Atlanta-to-Birmingham—is required to complete the telephone call.

Double-trunked voice channel telephone circuits inefficiently load long distance voice channel trunks. Telephone service providers have therefore developed advanced intelligent networks that accommodate telephone services requiring the use of intelligent telephone service handling platforms without relying on double-trunked telephone circuits. Such systems typically use a network of data links to replace portions of previously double-trunked voice channel circuits. Data links are capable of transmitting digital data messages, but do not need to be capable of transmitting voice channel communications.

In an advanced intelligent network, a network of data links typically interconnects a plurality of intelligent platforms with a plurality of switches. Switches route voice channel communications, whereas intelligent platforms perform sophisticated data processing tasks. Switches and intelligent platforms communicate with each other by placing digital data messages on the network of data links. For example, an advanced intelligent network would complete the above described communication by establishing a voice channel circuit directly between the Birmingham originating station and the Birmingham called station through one or more Birmingham switches, and messages between a Birmingham switch and the Atlanta intelligent platform would be transmitted over the network of data links. Thus, double-trunked voice channel circuits would be avoided. The operation of an advanced intelligent network is familiar to those skilled in the telecommunications art. See, for example, the commonly assigned pending U.S. patent application Ser. No. 08/204,677 entitled "Method for Routing Calls Based on Predetermined Assignment of Caller's Geographic Locations," inventors Janine M. Irwin et al., filed Mar. 1, 1994, which is incorporated herein by reference.

In an advanced intelligent network, a voice channel communication requiring the use of an intelligent telephone service handling platform is typically received and temporarily held at a switch while the switch and an intelligent platform transmit digital data messages to each other over the network of data links. Many switches and many intelligent platforms may be simultaneously transmitting digital data messages over the network of data links. A "transaction ID" is therefore assigned to messages pertaining to a particular voice channel communication. A transaction identifier is a precursor code transmitted along with a message that allows an intelligent platform or a switch to recognize that the message pertains to a particular communication. The use of a transaction identifier allows a switch and an intelligent platform to engage in bi-directional communications.

Maintaining a bi-directional communication capability between a switch and an intelligent platform for a particular purpose, also known as "keeping a transaction open," requires that the switch and the intelligent platform each maintain a transaction identifier and other information related to the communication in memory. A "transaction" in this context is a bi-directional communication capability between two network elements for which each network element allocates a portion of memory. The allocated memory is used to store a transaction identifier and other information that facilitates the conduct of bi-directional communications.

Maintaining an open transaction occupies memory within the network elements participating in the transaction. The amount of memory allocated by a network element may vary from transaction to transaction. For example, in some cases only about 24 bytes of memory may be allocated to keep a transaction open. A large number memory allocations of this size, however, may consume all of the available memory in the network element. Thus, regardless of the precise size of each allocation, the need to allocate a portion of memory to maintain each open transactions results in a memory constraint for the network element. If the network element only has a limited amount of memory to allocate to transactions, this memory constraint effectively limits the number of simultaneous open transactions that may be maintained by the network element.

Each intelligent platform in an advanced intelligent network presently has a limited amount of memory that can be allocated to transactions. Each intelligent platform thus supports only a limited number of simultaneous open transactions. It is therefore advantageous to close a transaction as soon as possible. The memory used to maintain the open transaction is thereby made available for use in association with another transaction. It will therefore be appreciated that the amount of memory available in an intelligent platform for maintaining open transactions limits the number of simultaneous bi-directional communications that can be handled by the platform.

The provision of duration demarcated, cost demarcated, duration limited, and cost limited telephone services presently requires the use of an open transaction between a switch and an intelligent platform. A large scale prepaid telephone card program, or the general availability of duration demarcated, cost demarcated, duration limited, or cost limited telephone services would require a large number of simultaneous open transactions. Conventional methods of implementing prepaid telephone card services would have a significant drawback if applied to a large scale prepaid telephone card program or to generally available duration demarcated, cost demarcated, duration limited, or cost limited telephone services telephone services. Namely, an intelligent platform would have to control each communication during the entire course of the communication. Thus, an open transaction would have to be maintained during the entire course of the communication. A large number of simultaneous duration demarcated, cost demarcated, duration limited, or cost limited telephone calls would therefore require a large allocation of memory within an intelligent platform. Ultimately, significant costs would be incurred to provide increased intelligent platform memory and processing capability, i.e., to increase the number of open transactions that can be maintained simultaneously.

Thus, there is a need for a method and system for providing duration demarcated, cost demarcated, duration limited, and cost limited telephone services that do not require that a switch and an intelligent platform maintain a bi-directional communication capability during the entire course of a communication.

There is a further need for a communication service that apprises a caller of the cost of a telephone call while the call is in progress.

There is a further need for a communication service that apprises a caller of the duration of a telephone call while the call is in progress.

There is a further need for a telephone service that automatically disconnects a communication upon the expiration of a specific duration.

There is a further need for an improved telephone service that automatically disconnects a communication upon the incurrence of a specified cost.

There is a further need for an improved telephone service that charges the cost of a communication to an account having a prepaid balance and that disconnects the communication upon the exhaustion of the prepaid balance during the course of the communication.

SUMMARY OF THE INVENTION

Generally, the present invention is an improved method and system for providing service functions in association with a communication. The present invention provides a method and system for implementing duration demarcated, cost demarcated, duration limited, or cost limited communication services within an intelligent switched telecommunications network. A duration demarcated communication typically includes at least one audible demarcation signal such as a beep, tone, or message that indicates the duration of the communication to the parties conducting the communication. For example, one beep may be heard after ten minutes, two beeps after twenty minutes, three beeps after thirty minutes, etc. A cost demarcated communication is similar to a duration demarcated communication except that a signal such as a beep is used to indicate the cost of the communication. For example, one beep may be heard when the cost of the communication reaches one dollar, two beeps after two dollars, three beeps after three dollars, etc. A duration limited communication is a communication that is automatically disconnected after the expiration of an allowed duration. For example, such a duration limited communication may be automatically disconnected after thirty minutes of the connection between the parties. A cost limited communication is a communication that is automatically disconnected after the incurrence of an allowed cost. For example, such a cost limited communication may be automatically disconnected when the cost of the communication reaches the balance in a prepaid account.

The preferred environment for the present invention is an intelligent switched telephone network including a first network element, a second network element, and a data link functionally connecting the first network element and the second network element. According to the present invention, a method and system is provided for implementing service functions in association with a communication between an originating station and a called station. A communication is received at the first network element from the originating station. The communication includes identification information. A transaction is opened for use in a bi-directional exchange of messages relating to the communication between the first network element and the second network element. The communication is held at the first network element while the identification information is sent via the data link from the first network element to the second network element. The second network element determines processing instructions for implementing the service functions. The second network element then sends a processing message via the data link to the first network element. The processing message includes the processing instructions. The transaction is then closed. In response to receiving the processing message, the first network element routes the communication for connection from the originating station to the called station. The first network element then implements the service functions in accordance with the processing instructions.

A first preferred embodiment of the present invention is a method and system for charging the cost of a communication from an originating station to a called station to a prepaid account. A communication is received at the first network element. The communication includes identification information. The communication is held at the first network element while the identification information is sent via the data link from the first network element to the second network element. The second network element determines that the cost of the communication is to be charged to a prepaid account. The prepaid account is identified based on the identification information. A processing message is sent via the data link from the second network element to the first network element. In response to receiving the processing message, the first network element routes the communication for connection from the originating station to the called station. The duration of the communication is measured so as to provide the first network element a measured duration of the communication from the connection of the communication to the disconnection of the communication between the originating station and the called station. The measured duration of the communication is provided via the data link from the first network element to the second network element. The second network element determines the cost of the communication based on the measured duration of the communication and debits the cost of the communication against the prepaid account.

According to another aspect of the method for charging the cost of a communication from an originating station to a called station to a prepaid account, the second network element determines an allowed duration of the communication based on the identification information and the prepaid balance in an account. Upon expiration of the allowed duration of the communication, the first network element effects the disconnection of the communication.

According to another aspect of the method for charging the cost of a communication from an originating station to a called station to a prepaid account, upon receiving the communication at the first network element, a transaction is opened for use in a bi-directional exchange of messages relating to the communication between the first network element and the second network element. Before the first network element routes the communication for connection from the originating station to the called station, the transaction is closed.

A second preferred embodiment of the present invention is a method and system for apprising the parties to a communication of the duration of the communication while the communication is in progress. A communication is received at the first network element, the communication including identification information. The communication is held at the first network element while the identification information is sent via the data link from the first network element to the second network element. The second network element determines a demarcation interval for the communication and provide a demarcation message to the first network element, the demarcation message including the demarcation interval. In response to receiving the demarcation message, the first network element routes the communication for connection to the called station, and plays a demarcation signal to the communication upon expiration of the demarcation interval.

According to another aspect of the method for apprising the parties to a communication of the duration of the communication while the communication is in progress, the second network element determines an allowed duration of the communication based on the identification information and the prepaid balance in an account. Upon expiration of the allowed duration of the communication, the first network element effects the disconnection of the communication.

According to another aspect of the method for apprising the parties to a communication of the duration of the communication while the communication is in progress, upon receiving the communication at the first network element, a transaction is opened for use in a bi-directional exchange of messages relating to the communication between the first network element and the second network element. Before the first network element routes the communication for connection from the originating station to the called station, the transaction is closed.

According to another aspect of the method for apprising the parties to a communication of the duration of the communication while the communication is in progress, the demarcation interval and the allowed duration are based on a monetary rate for the communication as calculated using the identification information.

According to another aspect of the method for apprising the parties to a communication of the duration of the communication while the communication is in progress, the demarcation interval and the allowed duration are based on subscriber information relating to the originating station.

More specifically described, the preferred environment of the present invention is an intelligent switched telecommunications network including a switch, a service control point, and a data link functionally connecting the switch and the service control point. The present invention is a method and system for implementing a demarcated voice channel communication of an allowed duration between an originating station and a called station. A communication is received at a switch from an originating station. The communication has identification information associated therewith including a request that the communication be processed as a demarcated voice channel communication. The switch holds the communication at the switch pending receipt of a message relating to the communication from a service control point. The switch provides the identification information via the data link to the service control point. The service control point determines a demarcation interval for the communication. The demarcation interval is based on subscriber information relating to the originating and called stations. The subscriber information is accessed through the identification information. The service control point also determines an allowed duration for the communication. The allowed duration is based on a monetary rate for the communication and a prepaid balance in an account associated with the subscriber information. The service control point provides a demarcation message to the switch. The demarcation message includes the demarcation interval. The service control point also provides an allowed duration message to the switch. The allowed duration message includes the allowed duration. In response to receiving the demarcation message and the allowed duration message, the switch sets a timer to the demarcation interval, to a warning interval, and to the allowed duration. The switch then routes the communication for connection to the called station, measures the duration of the communication by decrementing the timer upon connection of the communication, and plays a demarcation signal upon expiration of the demarcation interval. The switch plays a warning signal upon expiration of the warning interval and effects disconnection of the communication upon expiration of the allowed duration. After the disconnection of the communication, the switch provides via the data link the service control point with the measured duration of the communication. In response to receiving the measured duration of the communication, the service control point determines a cost for the communication and deducts the cost from the prepaid balance in the account associated with the subscriber information.

According to another aspect of the method for implementing a demarcated voice channel communication of an allowed duration between an originating station and a called station, upon receiving the communication, a transaction is opened for use in a bi-directional exchange of messages relating to the communication between the switch and the service control point. Before the switch is caused to route the communication for connection from the originating station to the called station, the transaction is closed.

While the preferred embodiments of the present invention are disclosed in the context of an intelligent switched telephone network, those skilled in the art will appreciate that the principles of the present invention may be applied to virtually any type of communication network that incorporates intelligent communication handling devices.

Therefore, it is an object of the present invention to provide a communication service that apprises the parties to the communication of the cost of the communication while the communication is in progress.

It is a further object of the present invention to provide a communication service that apprises the parties to the communication of the duration of the communication while the communication is in progress.

It is a further object of the present invention to provide a communication service that automatically disconnects the communication upon the expiration of an allowed duration.

It is a further object of the present invention to provide a communication service that automatically disconnects the communication upon the incurrence of an allowed cost.

It is a further object of the present invention to provide a communication service that charges the cost of the communication to an account having a prepaid balance and that disconnects the communication upon the exhaustion of the prepaid balance during the course of the communication.

It is a further object of the present invention to provide a duration demarcated, cost demarcated, duration limited, or cost limited telephone service that does not require that a first network element and a second network element maintain a bi-directional communication capability during the entire course of the communication.

That the present invention and the preferred embodiments thereof improve over the drawbacks set forth above and accomplish the objects of the invention set forth herein will become apparent from the detailed description of the preferred embodiment to follow.

BRIEF DESCRIPTION OF THE DRAWINGS

FIG. 5 is a message flow diagram that illustrates a preferred method for implementing a prepaid telephone card service.

FIG. 8 is a message flow diagram illustrating a preferred method for implementing a subscription based demarcated telephone service.

DETAILED DESCRIPTION

Description of the Preferred Environment of the Preferred Embodiment

Figure 1:
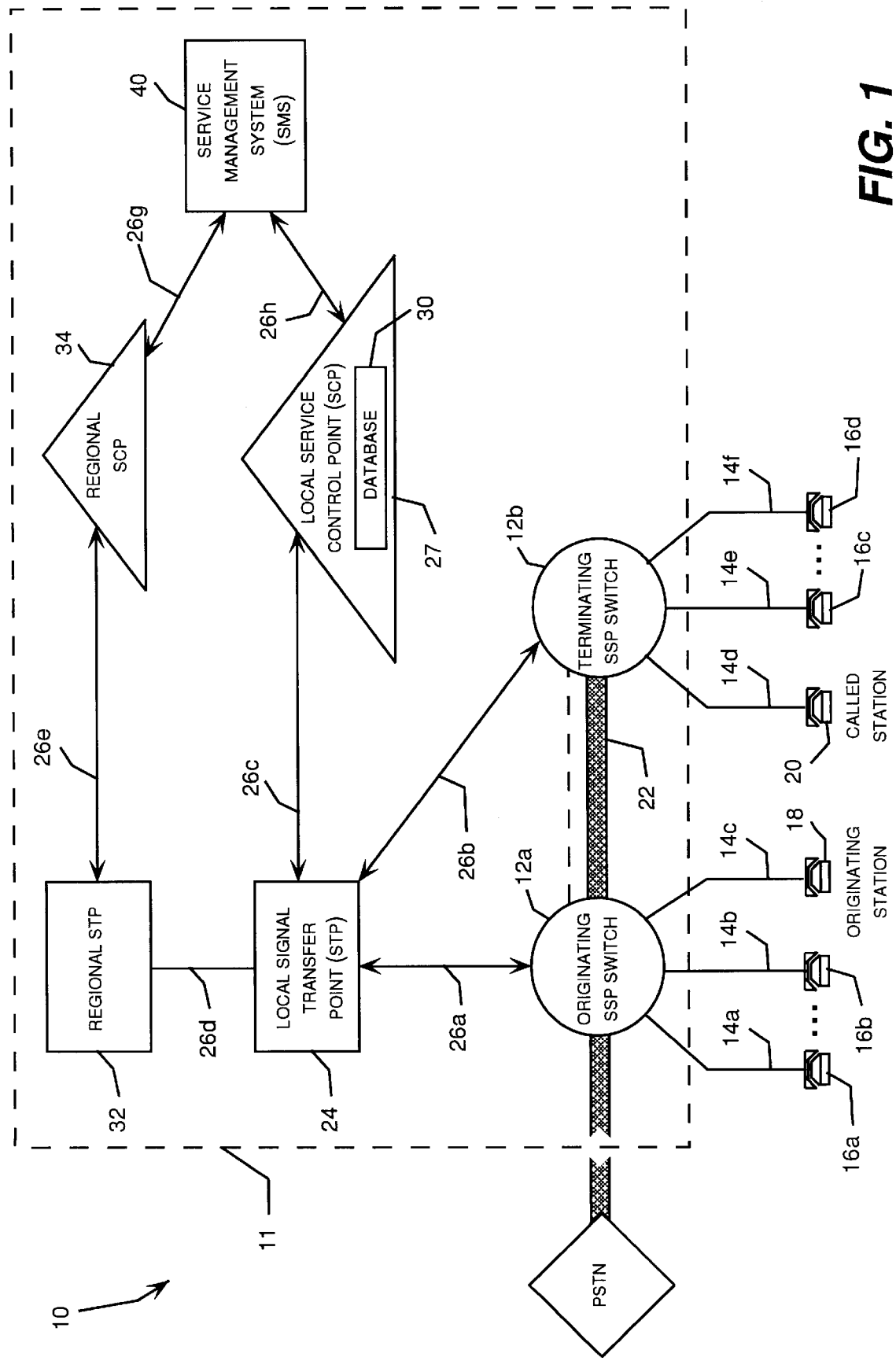
FIG. 1 is a diagram of a prior art existing switched telephone network including the Advanced Intelligent Network that controls same.

Referring now to the drawings, in which like numerals indicate like elements throughout the several figures, FIG. 1 is a diagram of a prior art existing switched telephone network including the Advanced Intelligent Network that controls same. FIG. 1 is a block diagram illustrating the public switched telephone network (PSTN) 10 and an illustrative portion 11 of the PSTN. In particular, the portion 11 of the PSTN illustrates a part of the Advanced Intelligent Network (AIN) of a typical local exchange carrier. The AIN, which is well known to those skilled in the art, is the preferred environment of the preferred embodiment of the present invention.

The AIN includes a plurality of central offices with some of the central office switches equipped with a service switching point (SSP). A plurality of representative SSPs are shown as SSPs 12a and 12b in FIG. 1. An SSP (specifically, a Class 5 central office switch) is the AIN component of a typical electronic central office switch used by a local exchange carrier. The terms "SSP" and "switch" are used interchangeably herein and are understood to refer to a telecommunications switch for connecting voice channel circuits including voice channel lines commonly designated as 14 in FIG. 1. Switches are interconnected through a network of high volume voice channel lines known as "trunks" represented by trunk 22 in FIG. 1. In the preferred environment, an SSP is equipped with AIN software release 0.1 or higher release. For more information, see Bellcore Specification TR-NWT-001284 Switching Systems Generic Requirements for AIN 0.1, which is incorporated herein by reference.

The dashed lines between the switches 12a and 12b indicate that the number of switches is arbitrary. As noted above, the AIN also may comprise non-SSP central office switches, but such non-SSP switches are not shown in FIG. 1. The difference between an SSP and a non-SSP switch is that an SSP includes intelligent network functionality including appropriate hardware and software for communicating with other intelligent components in the AIN through digital data messages transmitted over a network of digital data links commonly designated as 26 in FIG. 1. An SSP is configured so that, when a set of predetermined conditions known as a trigger are detected in association with a communication, the SSP generates an appropriate digital data message to be sent out over the network of digital data links. The SSP suspends handling of a communication until the SSP receives a reply from an appropriate network element via the network of digital data links instructing the SSP to take certain action. If the SSP receives no instructions within a certain amount of time, the SSP executes a default task with respect to the predetermined set of conditions. A non-SSP switch can generate certain rudimentary data packets and provide them over the network of digital data links. However, the non-SSP switch must rely on other equipment to provide subscriber lines connected to such a non-SSP switch with more complex features and service functions available in the AIN.

As is well known to those skilled in the art, the AIN also includes a tandem switch (also referred to as a "tandem central office") that interconnects local offices, SSPs, and interexchange carriers (IXCs, which are Class 4 offices). In particular, if an interoffice trunk or an IXC trunk to an SSP becomes unavailable or overloaded, an alternate routing plan can be implemented so that calls are processed through the tandem to reach the SSP. As alternate routing paths, the tandem switches include the same equipment and are provided with the same information available to their respective SSPs. The present invention preferably operates with the deployment of either the SSP, such as SSP 12a, or its tandem.

As further illustrated in FIG. 1, SSPs 12a and 12b interconnect a plurality of subscriber voice channel lines commonly designated as 14. Typically, the number of subscriber lines serviced by each switch is on the order of 10,000 to 70,000 lines. Each subscriber line is connected to a piece of terminating equipment, typically a telephone, commonly designated as 16. Although telephones are illustrated as the pieces of terminating equipment in FIG. 1, those skilled in the art will understand that terminating equipment may include other communication devices such as wireless telephones, facsimile machines, computers, modems, etc. One of the illustrated telephones is designated as an originating station 18 that is operated by a calling party. Another of the illustrated telephones is designated as a called station 20 that is operated by a called party. Reference to the originating station and the called station will be useful in the description of the preferred embodiment as set forth below in which a communication, typically a telephone call, is connected between the originating station and the called station. By way of example, FIG. 1 illustrates the originating station 18 as connected via subscriber line 14c to SSP 12a, and the called station 20 as connected via subscriber line 14d to SSP 12b. SSPs 12a and 12b allow the subscriber lines 14c and 14d, respectively, to be selectively connected via the voice channel trunk 22 to complete a voice channel connection between the originating station 18 and the called station 20.

Each piece of terminating equipment in the PSTN 10 is assigned a ten digit directory number. In the description of the present invention, the term "directory number" is used in its generally understood meaning to be the number that is dialed or input by a calling party at an originating station to reach a piece of terminating equipment such as a called station associated with the directory number. A directory number is commonly referred to as a telephone number and may be assigned to a specific line 14 or to a mobile cellular radiotelephone unit connected to the PSTN 10 by way of a Mobile Telephone Switching Office (MTSO), as is known to those skilled in the art. It should be noted that a directory number is not necessarily assigned to a single piece of terminating equipment, but may be shared by several pieces of terminating equipment. For example, a household may include several different telephones, a facsimile machine and a computer with a modem. It is likely that the several telephones in the home all will be assigned the same directory number so that a communication that terminates at the home may be conveniently answered at any of the telephones in the home. However, it is likely that the facsimile machine and the computer each will have a different directory number from the directory number assigned to the home telephones. These numbers may be different because the communication services provided to the facsimile machine and to the computer may be billed differently from the telephones, or may be serviced differently from the telephones, or may be set up so that their use does not interfere with the telephones.

Switches 12a and 12b are interconnected by a network of trunk circuits represented by trunk 22 in FIG. 1. Trunks are the voice channel circuits that interconnect the central office switches to connect voice channel communications. The term "communication" is used herein to include all messages or communications that may be exchanged between two pieces of terminating equipment. It should be understood that central office trunking in a typical urban environment is not limited to a daisy chain arrangement as implied by FIG. 1. In other words, a network of trunk circuits interconnect SSPs 12a and 12b with other SSPs (not shown) servicing other the pieces of terminating equipment.

Each SSP in the AIN is connected to a local signal transfer point (STP) via a data link. This arrangement is represented in FIG. 1 by SSPs 12a and 12b which are connected to STP 24 by respective data links 26a and 26b. Currently, these data links are 56 kilobit per second bi-directional data links employing a signaling protocol referred to as Signaling System 7 (SS7), which is well known to those skilled in the art. STP 24 is a multi-port high speed packet switch that is programmed to respond to the routing information in the SS7 protocol, and route the packet to its destination. STPs are conventionally installed in redundant pairs (like the tandem central offices) with accompanying data links. The redundant devices are not illustrated for sake of simplicity in the drawings.

Much of the intelligence of the AIN resides in local service control points (SCPs) represented by SCP 27 that is connected to STP 24 via SS7 data link 26c. An SCP is an intelligent communication processing platform. As is known to those skilled in the art, SCPs are physically implemented by relatively powerful fault tolerant computers. Typical implementation devices include the Star Server FT Model 3200 or the Star Server FT Model 3300, both sold by American Telephone & Telegraph Company. Typically, SCPs are provided in redundant pairs. Among the functions performed by SCPs is the maintenance of network databases that are used in providing services. For example, SCP 27 include databases represented by the illustrated subscriber information database 30 that identifies particular service subscribers and the services to be accorded to these subscribers.

In order to keep the processing of communications as simple as possible, a relatively small set of triggers is defined at the switches for each communication. A trigger in the AIN is an event associated with a particular communication that causes the SSP to generate a message packet to be sent to an SCP. The message packet causes the SCP to query its database and undertake other processing steps to determine which customized communication features or service functions should be implemented for this particular communication. The results of the SCP's processing are sent back to the SSP in the form of a reply message packet. The SSP and the SCP may then exchange a series of bi-directional messages that may involve the calling party in an interactive communication set up process. Through this exchange of messages, the SCP obtains information from the calling party and provides the SSP with the information necessary to implement the customized communication features or service functions that should be implemented for the particular communication. Eventually, the SCP instructs the SSP to route the communication for connection with the called party. The details of communication routing are familiar to those skilled in the art and will not be further described herein. For more information, see Bellcore Specification TR-NWT-001284 Switching Systems Generic Requirements for AIN 0.1 referenced above.

Additional devices for routing communications among various local exchange carriers are provided by a regional STP 32 and a regional SCP 34. Both the regional SCP and the local SCP are connected via respective data links 26g and 26h to a service management system (SMS) 40. The SMS is also implemented by a large general purpose computer and interfaces to business offices of the local exchange carrier and interexchange carriers. The SMS downloads information to the databases of SCPs 30 and 34 when subscribers set up or modify their ensemble of AIN services. Similarly, the SMS downloads on a non-realtime basis, billing information that is needed in order to appropriately invoice subscribers for the services provided.

General Description of the Preferred Embodiments

The present invention is an improved method and system for implementing service functions in association with a communication between an origination station and a called station, preferably the originating station 18 and the called station 20 shown in FIG. 1. The communication is received from the originating station at a first network element, preferably the originating switch 12a shown in FIG. 1. The communication includes identification information. A transaction is opened for use in a bi-directional exchange of messages relating to the communication between the first network element and a second network element, preferably the SCP 27. The communication is held at the first network element while the identification information is sent, preferably via the data link network 26, from the first network element to the second network element. The second network element determines processing instructions for implementing the service functions. The second network element then sends a processing message to the first network element. The processing message includes the processing instructions. The transaction is then closed. In response to receiving the processing message, the first network element routes the communication for connection from the originating station to the called station. The first network element then implements the service functions in accordance with the processing instructions.

The present invention provides a method and system for implementing duration demarcated, cost demarcated, duration limited, or cost limited communication services within an intelligent switched telecommunications network. A duration demarcated communication typically includes at least one audible demarcation signal such as a beep, tone, or message that indicates the duration of the communication to the parties conducting the communication. For example, one beep may be heard after ten minutes, two beeps after twenty minutes, three beeps after thirty minutes, etc. A cost demarcated communication is similar to a duration demarcated communication except that a signal such as a beep is used to indicate the cost of the communication. For example, one beep may be heard when the cost of the communication reaches one dollar, two beeps after two dollars, three beeps after three dollars, etc. A duration limited communication is a communication that is automatically disconnected after the expiration of an allowed duration. For example, such a duration limited communication may be automatically disconnected after thirty minutes of the connection between the parties. A cost limited communication is a communication that is automatically disconnected after the incurrence of an allowed cost. For example, such a cost limited communication may be automatically disconnected when the cost of the communication reaches the balance in a prepaid account.

The present invention provides a method and system for implementing a wide range of service functions in association with communications. For example, a first preferred embodiment of the present invention is a method and system for charging the cost of a communication to a prepaid account. Such a communication is preferably disconnected upon the expiration of an allowed duration that is based on the balance in the prepaid account and a monetary rate for the communication. This first preferred embodiment of the present invention is considered appropriate for a prepaid telephone card system.

A second preferred embodiment of the present invention is a method and system for apprising the parties to a communication of the duration or cost of the communication while the communication is in progress. A demarcation scheme is preferably defined in a demarcated communication service profile established by a subscriber. Demarcation signals are played to a communication in accordance with the demarcation scheme defined in a subscriber's demarcated communication profile. This second preferred embodiment is considered appropriate for a demarcated communication service that is available as a subscription service.

The present invention contemplates the provision of demarcated communication services on a much larger scale than conventional prepaid telephone card services. For example, it would be advantageous if tens or hundreds of thousands of prepaid telephone cards could be handled within the geographic area served by a regional telephone service provider such as BellSouth Corporation. In addition, it would be advantageous if demarcated communication services could be made generally available as a subscription service. The present invention provides an improved method and system for implementing demarcated communication services in an intelligent switched communications network. This improved method manages the data processing load associated with demarcated communication services more effectively than prior methods, and thereby allows existing equipment to handle a larger number of demarcated communications simultaneously.

General Description of the Operation of the Preferred Embodiments in the Preferred Environment The provision of a demarcated telephone service to a communication received from an originating station 18 preferably involves at least the AIN components illustrated in FIG. 1 by the SSP 12a, the STP 24, and the SCP 27. Other devices such as the regional STP 32, the regional SCP 34, the SMS 40, additional STPs and SCPs (not shown), and other intelligent platforms (not shown) may also be involved in the provision of demarcated telephone services. All of these devices are interconnected with the originating SSP 12a via the SS7 data link network 26 and may therefore transmit and receive data link messages in connection with the provision of demarcated telephone services.

The preferred method begins when the originating SSP 12a receives a communication from the originating station 18. The received communication is typically a calling party's input associated with the placement of a conventional telephone call. For example, the communication may be created when the calling party activates the originating station and begins to place a telephone call by pressing the keys on a conventional touch-tone telephone. The calling party usually requests a prepaid communication by dialing the prepaid card access station's directory number, usually an "800" number. The calling party may then input the called party's directory number. The input of the called station's directory number may, however, be deferred to a later stage of the communication set up process. In either case, the communication received by the originating SSP includes identification information including a trigger that causes the switch to initiate specialized communication handling procedures. The trigger preferably includes either the calling station's directory number, an input sequence that includes a trigger code such as "*xx" that may be followed by the called station's directory number, or a specific sequence of dialed digits following the called station's directory number. For example, a demarcated telephone service may be triggered generally for all communications originating on a particular line or from a particular mobile cellular radiotelephone. Alternatively, a trigger code such as "*xx" may be used, either before or after the called station's directory number, to initiate a demarcated communication service on a per-communication basis. In another alternative, a demarcated communication service may be triggered for all communications directed to a predefined called station, or all communications from a predefined originating station to a predefined called station or a predefined set of called stations.

The communication received by the originating SSP may include additional identification information such as an account number, long distance carrier code, personal identification number (PIN), and/or other predefined information establishing a protocol for initiating a demarcated telephone service. Alternatively, the calling party may dial a special directory number that is recognized as a trigger by the originating SSP, or that causes the originating SSP to exchange data link messages or connect the communication with another intelligent device. For example, the originating SSP may interact with an SSP, SCP, or some another specialized intelligent platform that provides some or all of the functionality described below. Such an intelligent platform may or may not function as a voice channel switch.

In response to the trigger received from the originating station 18, the originating SSP 12a holds the communication while the SSP engages in a bi-directional exchange of data messages with the SCP 27 via the SS7 data link network 26. In other words, the SSP defers routing the communication to the called party station 20 until the SSP receives instructions from the SCP. As will be well known to those skilled in the art, the initial data link message generated by the SSP is generally known as a "query" message. A query message is defined by the AIN protocol as a type of data link message that requires a reply. A query message indicates the beginning of a bi-directional data link exchange generally known as "transaction," i.e., a query message opens a transaction. A query message generated by the originating SSP typically includes the SSP's address, known as the "originating point code," the calling station's directory number, the called station's directory number, the trigger code, and any additional identification information provided by the calling party. The query message also generally includes a random number generated by the SSP that is used as a "transaction ID." The SSP 12a and the SCP 27 may be simultaneously processing many communications. Thus, the transaction ID generated by the SSP is included in the reply to a query message so that the SSP can associate the reply message with a particular query message.

As is well known to those skilled in the art, a query message is transmitted from an SSP such as SSP 12a via the data link network 26 to an STP such as STP 24. The STP searches a message routing table, usually with reference to the trigger code, the originating station number, or the called station number included in the query message to determine which SCP should receive the query message. The database search conducted by the STP is generally required because the AIN shown generally at 11 in FIG. 1. includes, in addition to the SCP 27, other SCPs that are not shown. The SCP that should receive the query message is represented in FIG. 1 by SCP 27. The STP adds the SCP's address, known as the "destination point code," and an application subsystem number to the query message packet. The STP 24 then transmits the query message to the SCP 27 via the data link 26c.

In response to receiving the query message, the SCP 27 opens a transaction by allocating a portion of memory for storing the information about the SSP and the transaction including all or part of the contents of the query message. The SCP stores most or all of the contents of the query message because the SCP may use the trigger code, the originating station's directory number, the called station's directory number, and any other identification information included in the query message to process the communication. The SCP also stores the originating and destination point codes and the SS7 data link number so that the SCP can include this information in subsequent messages. Including the originating and destination point codes and the SS7 data link number in subsequent messages avoids having STP 24 again reference its database in connection with the transaction.

The transaction opened by the SCP 27 corresponds to the transaction opened by the SSP 12a. Information related to the communication stored at both the SSP and the SCP, such as the transaction ID generated by the SSP, allows the SSP and the SCP to engage in a bi-directional exchange of messages related to the communication via the data link network 26. In addition, the SCP generates a second transaction ID for the communication that is stored relative to the communication. Associating each transaction with two transaction IDs, each transaction ID being generated by a different network element—the originating SSP 12a and the SCP 27—virtually eliminates the possibility that any two transactions will be assigned the same transaction IDs.

In the preferred method of the present invention, the SCP 27 responds the query message by referencing a database to determine which service functions should be applied to the communication. The data and logic for implementing service functions such as demarcated telephone services are located primarily within the SCP. For example, the SCP maintains databases of prepaid telephone card account numbers and balances, subscriber demarcated service profiles, and telephone call rate information. The SCP performs the tasks of identifying the particular service functions to be applied to a particular communication, and providing the SSP 12a with instructions including the information necessary for the switch to process the communication. The SCP incorporates the instructions in a reply message that is sent back to the SSP over the data link network 26 via the STP 24. The specific instructions and steps required to implement two preferred demarcated telephone services are described below with respect to FIGS. 3–8.

As is well known to those skilled in the art, the reply message generated by the SCP 27 may be one of two types: a "conversation" message or a "response" message. A conversation message is defined by the AIN protocol as a type of data link message that requires a reply as part of a preexisting transaction. In other words, a conversation message keeps a transaction open. Conversation messages are used generally by an SCP to obtain information from the calling party. Typically, a conversation message is used by the SCP to instruct the SSP 12a to play a voice channel message that prompts the calling party to input information. For example, the SCP may instruct the switch to "play message x" and to return the data received from the calling party in response to the message. Message x may prompt the calling party to "please input your account number (or called station number, or PIN, or long distance carrier code, etc.) followed by the # sign." Conversation messages allow a calling party to initiate a demarcated communication with a relatively short communication, and then provide any remaining requisite identification information through an interactive communication set up process. Such an interactive communication set up process is considered appropriate in connection with the preferred method of a prepaid telephone card service as described below with respect to FIGS. 3–5.

As explained above, a conversation message is one of the two types of reply messages. The other type of message is a "response" message. A response message is defined by the AIN protocol as a type of data link message that completes a bi-directional data link exchange of messages. In other words, a response message closes a transaction that was opened by a query message. A transaction relating to a particular communication therefore remains open from the time the SSP 12a transmits a query message relating to the communication until the SCP 27 transmits a response message relating to the communication. The memory allocated by the SSP and the SCP to keep the transaction open thus remains occupied until the SCP transmits a response message that closes the transaction. An SCP has a limited amount of memory to allocate to transactions. Therefore, the length of time during which a transaction is held open is a critical factor for an SCP that handles a large number of communications. More specifically, the number of communications that an SCP can handle simultaneously is limited by the length of time during which a transaction is held open.

It will be appreciated that it is advantageous to close a transaction as soon as possible. To minimize the time during which the transaction is held open, a response message may immediately follow a query message. A communication set up procedure in which a response message immediately follow a query message is possible when an interactive communication set up process is not required. Such a non-interactive communication set up procedure is considered appropriate in connection with the preferred method of the subscription based demarcated telephone services described in detail with respect to FIGS. 6–8.

The provision of a demarcated telephone service generally requires the provision of SCP-controlled procedures at various times during a communication. In the case of prepaid or cost or duration limited communication, SCP-controlled procedures are required at various times throughout the entire course of a communication. Conventional methods for implementing prepaid telephone card services require that the SSP 12a and the SCP 27 maintain an open transaction for the entire duration of the communication. Therefore, the memory required to maintain an open transaction is allocated within the SSP and the SCP for each prepaid communication for the entire duration of each communication. The limited availability of memory within the SCP would thus limit the number of simultaneous demarcated communications that the SCP could handle. Ultimately, additional memory would be required to increase the number of simultaneous transactions supported by the SCP. As the present invention contemplates the provision of a large number of demarcated communications, it will be appreciated that using these conventional methods to provide demarcated communication services on the scale contemplated by the present invention would be very costly.

Advantageously, the preferred embodiments of the present invention provide methods and systems whereby demarcated communication services are implemented by maintaining open transactions for only relatively short periods of time. A transaction is kept open only during the time required to set up a demarcated communication. The time required to set up a demarcated communication is generally the time from receipt of the communication by the originating SSP to the time the communication is routed for connection with the called party. The transaction is closed before the communication is routed for connection to the called party. The memory required to maintain the open transaction is thereby freed prior to connection of the communication between the originating station and the called station.

The average time required to set up a demarcated communication is on the order of thirty seconds for an interactive communication set up process and only a few seconds or less for a non-interactive process, whereas the average connection time is approximately seven minutes. The methods of the preferred embodiments of the present invention improve over the methods of conventional prepaid communication services by eliminating the connection time from the time during which a transaction relating to the communication must be kept open. It will therefore be appreciated that the methods of the preferred embodiments of the present invention, as compared to the methods of conventional prepaid communication services, greatly increases the number of simultaneous demarcated communications that an SCP can support.

Description of the Preferred Embodiments With Reference to AIN Message Protocol

Implementation of the preferred embodiments of the present invention will now be described with reference to the AIN message protocol that is familiar to those skilled in the art. The AIN message protocol establishes the syntax for a standardized set of messages that may be exchanged amongst the components of the AIN via the data link network 26. As described above, the AIN message protocol defines certain categories or types of messages, such as the query message, conversation message, and response message. Another type of message known as a "unidirectional" message is described below. A message type is one element of a message that conveys information regarding a message. The AIN protocol also defines specific messages whereby each message performs a defined function and contains defined parameters in defined fields. The "Info_Analyzed" message, "Analyze_Route" message, and "Termination_Notification" message referred to below are specific messages. A network element of the AIN receiving a specific message relies on the message type definition and the specific message definition in interpreting the message and responding in an appropriate manner. The details of the AIN message protocol are familiar to those skilled in the art and will not be further described herein except as noted below. For more information, see Bellcore Specification TR-NWT-001284 Switching Systems Generic Requirements for AIN 0.1 referenced above.

Referring again to FIG. 1, the query message generated by the SSP 12a is preferably an "Info_Analyzed" message. The reply message generated by the SCP 27 that causes the switch to route the communication for connection with the called station 20 is preferably an "Analyze_Route" message. According to the present invention, the Analyze_Route message is a response message that closes the transaction opened by the Info_Analyzed query message. To implement demarcated communication services, a "Call-Timer" parameter is preferably transmitted from the SCP to the SSP as part of a the Analyze_Route response message. The CallTimer parameter is used by the switch to set one or more timers that allow the switch to implement demarcated communication services after the transaction is closed. The CallTimer parameter provides the switch with all of the information necessary for the switch to implement the required demarcated communication services.

In the case of a prepaid communication, the SCP preferably includes an instruction known as a "Send_Notification" request in the Analyze_Route response message. The Send_Notification request instructs the switch to send a "Termination_Notification" message back to the SCP upon disconnection of the communication. A Termination_Notification message is a type of message known as a "unidirectional" message. A unidirectional message is defined by the AIN protocol as a type of message that is not associated with a transaction. A unidirectional message is typically not part of the communication handling process that must be completed prior to routing a communication for connection. The SSP obtains a measured duration of the communication from the connection between the originating station and the called station until the disconnection of the communication. The SSP includes the measured duration in the Termination_Notification message that is transmitted to the SCP upon disconnection of the communication. The SCP uses the measured duration of the connection to compute the cost of the communication. The SCP then deducts the cost of the communication from the prepaid account associated with the communication. It will be appreciated that many other types of accounting and reporting procedures may be implemented through the use of a Send_Notification instruction or a similar instruction and that such modifications are within the scope and spirit of the present invention.

The above described method for implementing a prepaid communication requires the use of a relatively small amount of memory within the SCP 27 to handle the unidirectional Termination_Notification message. The Send_Notification request preferably includes an "Echo_Data" parameter that is returned to the SCP in the Termination_Notification message. The SCP preferably generates a random number that is used as a "communication ID." The SCP includes the communication ID in the Echo_Data field of the Send_Notification request. The SSP returns the communication ID in the Echo_Data field of the Termination_Notification message sent back to the SCP. The SCP then uses the communication ID to associate the information returned in Termination_Notification message with the correct prepaid account.

The above described method for implementing a prepaid communication advantageously requires less memory within the SCP 27 than conventional methods for implementing prepaid communications. The above described method allows a transaction relating to a communication to be closed before the communication is routed for connection between the originating station 18 and the called station 20. The conventional methods, on the other hand, require an open transaction to be maintained during the entire course of the connection between the originating station and the called station. Maintaining an open transaction occupies a relatively large portion of memory within the SCP whereas storing only a communication ID occupies a relatively smaller amount of memory. Storing a communication ID rather than maintaining an open transaction during the course of the connection between the originating station and the called station therefore saves a substantial amount of memory.

General Description of the Preferred Embodiments Using a Logic Flow Diagram

Figure 2:
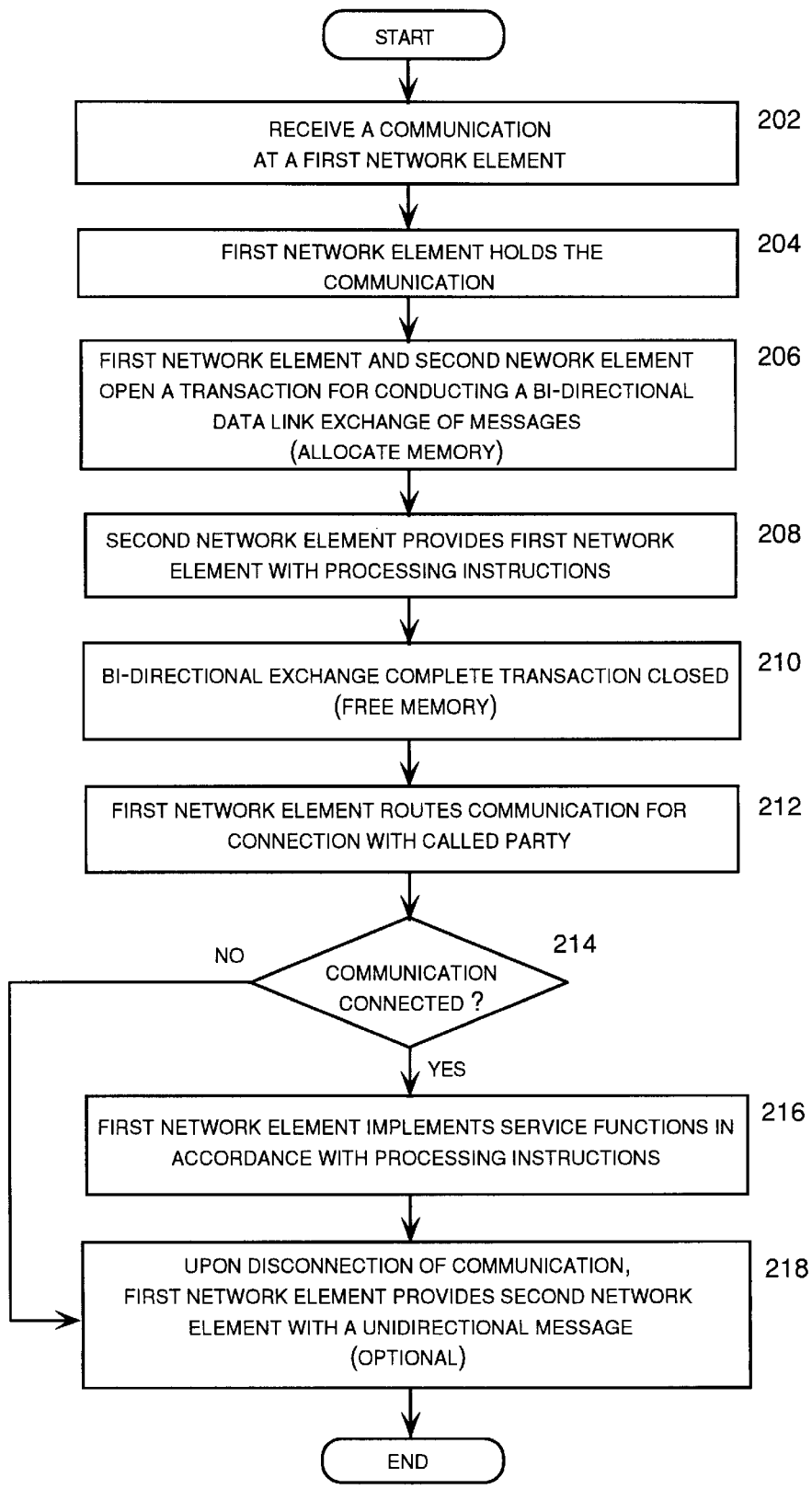
FIG. 2 is a logic flow diagram that illustrates a preferred method for implementing service functions in association with a communication.

FIG. 2 is a logic flow diagram that illustrates a method for implementing service functions in association with a communication. The logic flow diagram of FIG. 2 generally illustrates the preferred method of the present invention. By way of example, the preferred method shown in FIG. 2 will be described in the context of the preferred environment illustrated in FIG. 1 and with reference to the AIN message protocol familiar to those skilled in the art. It will be appreciated that the communication handling method illustrated by the logic flow diagram of FIG. 2 is not limited to operation within the preferred environment of FIG. 1 or to the AIN message protocol, but rather extends to any environment in which the inventive method may be employed.

In step 202, a first network element receives a communication. This communication preferably originates from the originating station 18 on the voice channel line 14a and is received by the originating SSP 12a. The received communication is typically a calling party's input associated with the placement of a conventional telephone call. For example, the communication may be created when the calling party activates the originating station and begins to place a telephone call by pressing the keys on a conventional touch-tone telephone. The communication preferably includes identification information including a trigger that is recognized by the first network element. In step 204, the first network element responds to the trigger by holding the communication and, in step 206, engaging in a bi-directional exchange of messages with a second network element. The second network element is preferably the SCP 27 and the bi-directional data exchange is preferably conducted over the data link network 26 via the STP 24. The SSP 12a initiates the bi-directional communication by transmitting an Info_Analyzed query message to the SCP. The query message opens a transaction for which the switch and the SCP each allocate a portion of memory. The ensuing bi-directional exchange may involve a single back-and-forth message exchange, or it may involve a series of bi-directional message exchanges.

In step 208, the second network element provides the first network element with processing instructions. The processing instructions are preferably included, in whole or in part, in an Analyze_Route response message generated by the SCP 27. The Analyze_Route message instructs the SSP 12a to route the communication for connection with the called station 20. The processing instructions preferably include a CallTimer parameter that the switch uses to implement service functions such as those associated with the provision of demarcated communication services. For example, in connection with a preferred prepaid telephone card service, the CallTimer parameter includes the allowed duration of a connection between the originating station 18 and the called station 20.

As shown in step 210, the Analyze_Route response message preferably closes the transaction involving the SSP 12a and the SCP 27 and thereby frees the memory allocated for the transaction by the SSP and the SCP. In step 212, the switch routes the communication for connection with the called station 20 in a conventional manner.

In decision step 214, it is determined whether the communication is connected. If the communication is not connected, the "NO" branch is followed to step 216 in which the first network element notifies the second network element that the communication was not connected. The communication may not be connected for any of a variety of reasons. For example, the called station directory number may be invalid, the called station may already be in use, the called station may not be in service, the required trunk or switching capacity may not be available, the calling party may hang up, etc. After step 216, the method illustrated by the logic flow diagram of FIG. 2 is at an end.

If the communication is connected, the "YES" branch is followed from step 214 to step 216 in which the first network element implements service functions in accordance with the processing instructions. The service functions may be any of the demarcated telephone services previously described in general terms. For example, in connection with a prepaid telephone card service, the first network element disconnects the communication if the duration of the connection between the originating station 18 and the called station 20 exceeds the allowed duration. Two preferred demarcated telephone services are described in detail with respect to FIGS. 3–8 below. It will be appreciated that many variations and modifications may be made to the preferred demarcated telephone services described herein and that such variations and modifications are within the scope and spirit of the present invention.

Optionally, the Analyze_Route message of step 208 also includes a Send_Notification request. The SCP preferably generates a random number that is used as a communication ID. The communication ID is included in the Echo_Data field of the Send_Notification request. The Send_Notification request causes the switch to provide the SCP with a Unidirectional Termination_Notification message upon the disconnection of the communication between the originating station 18 and the called station 20. The communication ID is preferably returned to the SCP in the Echo_Data field of the Termination_Notification message. The SCP then uses the communication ID to associate the Termination_Notification message with the correct communication. The communication ID is a one byte value that the SCP saves in memory for the duration of the connection between the originating station 18 and the called station 20. Saving the communication ID rather that keeping the transaction open for the duration of the connection reduces the amount of SCP memory occupied in connection with the communication from 24 bytes to one byte.

If the Analyze_Route message of step 208 includes a Send_Notification request, the first network element provides the second network element with notification upon disconnection of the communication as shown in step 218. If the communication is connected, the SSP obtains a measured duration of the communication from the connection between the originating station and the called station until the disconnection of the communication. The measured duration is the included in the Termination_Notification message that is transmitted from the SSP to the SCP upon disconnection of the communication. The SCP may then use the measured duration of the communication in further processing steps relating to the communication. For example, in connection with a prepaid telephone card service, the SCP uses the measured duration of the communication to compute a cost for the communication. The SCP then deducts the cost of the communication from a prepaid account. If the communication is not connected, for example because the called station is busy or unanswered, the SSP so notifies the SCP and no money is deducted from the prepaid account.

Description of the Preferred Embodiments Using Logic Flow Diagrams and Message Sequence Diagrams The logic flow diagrams and message sequence diagrams of FIGS. 3–8 illustrate the process steps executed by two specific preferred embodiments of the present invention. Using an analogy to electrical circuit diagrams, these figures are equivalent to a detailed schematic for an electrical circuit where the provision of the circuitry for electrical circuit blocks corresponds to provision of actual computer instructions for blocks of the flow chart. Thus, the coding of the process steps of these figures into instructions for suitable commercially available computers is a mere mechanical step for an engineer or other person skilled in the programming art.

A First Preferred Embodiment: A Prepaid Telephone Card Service

Figure 3:
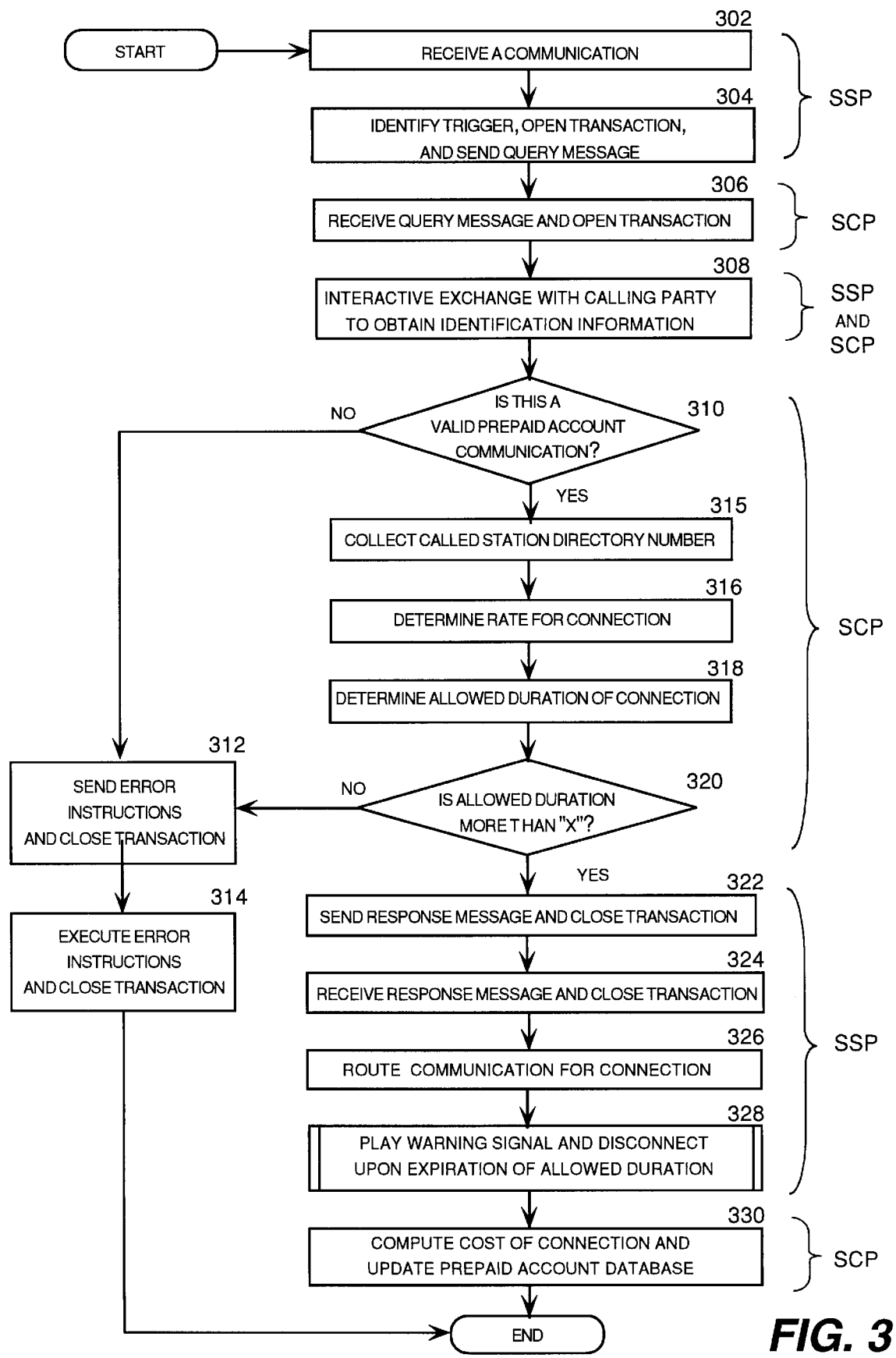
FIG. 3 is a logic flow diagram that illustrates a preferred method for implementing a prepaid telephone card service.
Figure 4:
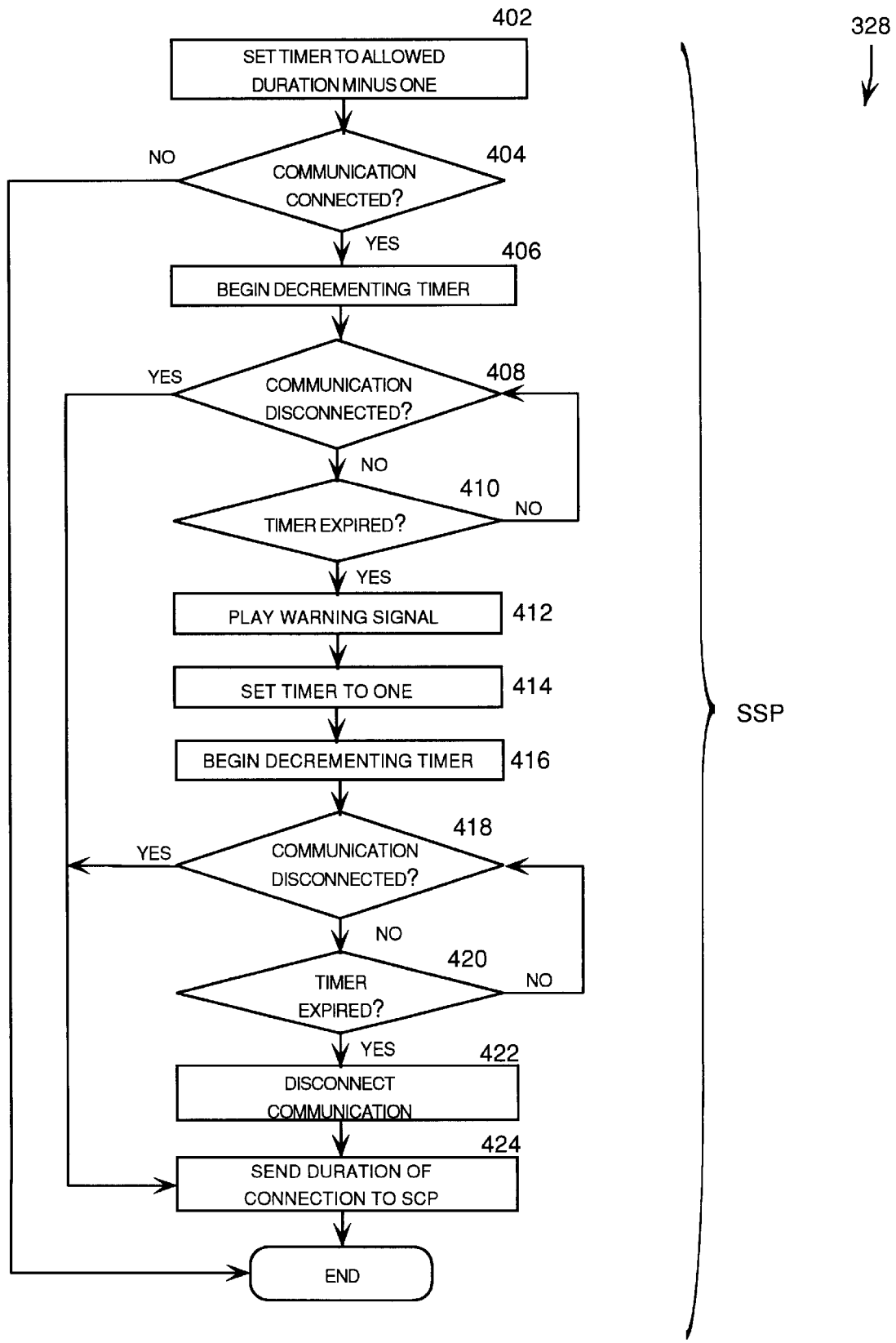
FIG. 4 is a logic flow diagram that illustrates a preferred method for disconnecting a communication upon the expiration of an allowed duration.

FIGS. 3–4 provide a logic flow diagram, and FIG. 5 provides a message sequence diagram, that illustrates a preferred method for implementing a prepaid telephone card service. The method illustrated by FIGS. 3–5 allows a calling party to charge the cost of a communication to a prepaid account associated with the prepaid telephone card. A communication placed using a prepaid telephone card is automatically disconnected when the cost of the communication exceeds the balance in the prepaid account. The parties to a communication placed using a prepaid telephone card are preferably given a warning one minute prior to the disconnection of the communication.

A calling party attempting to use a prepaid telephone card may not have any knowledge or experience in using the prepaid telephone card system. Therefore, a minimal amount of instruction necessary to inform the calling party how to initiate a communication using the prepaid telephone card is printed on the back of the card. After a calling party initiates a communication in accordance with the instructions printed on the card, an interactive communication set up process guides the calling party through the remaining communication set up procedure. The calling party preferably initiates a communication and responds to the audible prompts of the interactive communication set up procedure by pressing the keys on the originating station 18, a conventional touch-tone telephone. The initial communication input by the calling party preferably includes a trigger code such as "*xx" or a predefined directory number. An interactive communication set up process then follows.

Experienced calling parties preferably have the option of bypassing the interactive communication set up process by inputting all of the identification information required to set up the communication in a single encoded triggering input sequence. In connection with this aspect of the preferred prepaid telephone card service, the triggering input sequence may optionally include an account code associated with the prepaid telephone card and a called party directory number in a predefined format. Additional elements may be included in the triggering input sequence such as a long distance carrier code and a PIN.

The preferred method illustrated by the logic flow diagram of FIG. 3 begins with step 302 in which the originating SSP 12a receives a communication from the originating station 18 on the voice channel line 14c. The communication received by the switch preferably includes a trigger that is recognized by the switch in step 304. In response to the trigger, the switch holds the communication and generates an Info_Analyzed query message that is sent to the SCP 27 over the data link network 26 via the STP 24. The Info_Analyzed query message generated by the switch opens a transaction for which the switch allocates a portion of memory. In step 306, the SCP 27 receives the Info_Analyzed query message and allocates a portion of memory to open the transaction at the SCP. The memory allocated by the SCP and SSP for the transaction remains occupied until the SCP transmits a response message that closes the transaction.

In step 308, the SCP 27 and the SSP 12a preferably engage in a series of bi-directional conversation messages that involve the calling party in an interactive communication set up process. The SCP 27 uses a this series of conversation messages to instruct the SSP 12a to play certain messages to guide the calling party through the communication set up process. The calling party's response to each prompt is returned to the SCP. Typically, the calling party is first asked to select amongst a plurality of languages in which audible messages will be presented. The calling party is then prompted seriatim to input the account code, the PIN that was assigned by the calling party the first time the prepaid calling card was used, and the called station directory number.

In decision step 310, it is preferably determined whether the calling party has requested a valid prepaid account communication. If the calling party inputs an invalid response to a prompt, an error message is played that allows the calling party to try again up to three times. If the calling party fails three times to input a correct response or fails to respond for a predetermined time-out period, the "NO" branch is followed from step 310 to step 312 in which the SCP 27 generates a response message including error instructions that are transmitted to the SSP 12a. In step 314, the error response message causes the transaction to be closed and the communication to be disconnected.

If the calling party requests a valid prepaid account communication, the "YES" branch is followed from step 310 to step 317 to step 315 in which the called station's directory number is collected from the originating party. Step 315 is followed by step 316 in which the SCP 27 preferably determines a rate for a connection between the originating station 18 and the called station 20 in a conventional manner. The SCP maintains a database of rate information from which it can compute rates for connections between various terminating exchanges. In step 316, the SCP uses the originating station directory number and the called station directory number to determine a rate for a connection between the originating station and the called station. The SCP also maintains a database of prepaid telephone card information including balances in accounts corresponding to prepaid telephone cards. The SCP accesses this database to determine the balance in the account associated with the caller's prepaid telephone card. In step 318, the SCP uses the rate for the connection between the originating station and the called station and the balance in the account associated with the prepaid telephone card to determine the allowed duration for the connection. The allowed duration is preferably expressed as the maximum number minutes that a connection can be maintained between the originating station and the called station without causing the cost of the communication to exceed the balance in the prepaid account.

In decision step 320, the allowed duration is preferably compared to a minimum threshold value, typically one minute. If the allowed duration is less than the threshold value, the "NO" branch is followed from step 320 to step 312 in which the SCP generates a response message including error instructions that are transmitted to the SSP 12a. In step 314, the error response message causes the transaction to be closed and the communication to be disconnected. If the allowed duration is greater than the threshold value, the "YES" branch is followed from step 320 to step 322 in which the SCP 27 generates an Analyze_Route response message that is transmitted to the switch. The Analyze_Route response message preferably includes a CallTimer parameter and a Send_Notification request. The allowed duration is included in the Analyze_Route message as the CallTimer parameter. The SCP generates a random number that is used as a communication ID. The SCP includes the communication ID in the Echo_Data field of the Send_Notification request. The Analyze_Route response message closes the transaction opened by the Info_Analyzed query message and thereby frees the SCP memory associated with the transaction. The communication ID occupies one byte of memory whereas keeping a transaction open occupies 24 bytes of memory. Saving the communication ID rather than keeping the transaction open for the duration of the connection therefore reduces the amount of SSP memory occupied in connection with the communication from 24 bytes to one byte.

In step 324, the SSP 12a preferably receives the Analyze_Route response message. In response to receipt of the Analyze-Route message, the switch stores the communication ID and closes the transaction. In step 326, the switch routes the communication for connection with the called station 20. In routine 328, the switch implements the service functions associated with the prepaid telephone card. Routine 328 is described below with respect to FIG. 4 below.

Pursuant to the Send_Notification request, upon disconnection of the connection between the originating station 18 and the called station 20, the switch preferably sends a Termination_Notification message to the SCP. The Termination_Notification message includes the measured duration of the connection between the originating station and the called station. The Termination_Notification message also includes the communication ID in the Echo_Data field. In step 330, the SCP 27 uses the communication ID to access the correct prepaid account. The SCP then computes the cost of the communication and deducts the cost from the account balance.

FIG. 4 is a logic flow diagram that illustrates a preferred method for disconnecting a communication upon the expiration of an allowed duration. FIG. 4 corresponds to routine 328 from FIG. 3. The preferred method illustrated by FIG. 4 begins with step 402 in which the SSP 12a sets a timer to the CallTimer parameter received in the Analyze_Route response message. The CallTimer parameter is preferably the allowed duration in minutes, minus one. In decision step 404, it is determined whether the communication is connected between the originating station 18 and the called station 20. If the communication is not connected, the "NO" branch is followed and the method illustrated by the logic flow diagram of FIG. 4 is at an end.

If the communication is connected, the "YES" branch is followed from step 404 to step 406 in which the timer begins decrementing. Step 406 is preferably followed by decision step 408 in which it is determined whether the communication has been disconnected. If the communication has been disconnected, the "YES" branch is followed to step 424 in which the switch sends a Termination_Notification message to the SCP 27. If the communication has not been disconnected, the "NO" branch is followed to step 410 in which it is determined whether the timer has expired. If the timer has not expired, the "NO" branch is followed back to decision step 408. Routine 328 remains in the loop between decision steps 410 and 408 until the timer expires or the communication is disconnected.

If the timer expires, the "YES" branch is followed from step 410 to step 412 in which a warning signal is preferably played. The warning signal may be a beep or a short message such as "one minute remaining." In step 412, the timer is set to one, and in step 416 the timer immediately begins decrementing. In decision step 418, it is determined whether the communication has been disconnected. If the communication has been disconnected, the "YES" branch is followed to step 424 in which the switch sends a Termination_Notification message to the SCP 27. If the communication has not been disconnected, the "NO" branch is followed to step 420 in which it is determined whether the timer has expired. If the timer has not expired, the "NO" branch is followed back to decision step 418. Routine 328 remains in the loop between decision steps 420 and 418 until the timer expires or the communication is disconnected. If the timer has expired, the "YES" branch is followed to step 422 in which the SSP 12a disconnects the communication. Step 422 is followed by step 424 in which the switch sends a Termination_Notification message to the SCP 27. After step 424, the method illustrated by FIG. 4 is at an end.

FIG. 5 is a message flow diagram that illustrates a preferred method for implementing a prepaid telephone card service. The preferred method illustrated by FIG. 5 is the same as that illustrated by the logic flow diagrams of FIGS. 3–4. FIGS. 3–4 show the preferred method as an integrated logic flow diagram that involves processing steps performed by various the elements of the AIN 11. FIG. 5 more clearly illustrates the flow of messages amongst the elements of the AIN. The dashed lines shown in FIG. 5 indicate messages that are transmitted over the data link network 26. An arrow on a dashed line indicates the direction in which the message flows.

In step 502, the originating SSP 12a preferably receives a communication from the originating station 18. The switch identifies a trigger in step 504, holds the communication, and allocates a portion of memory required to open a transaction in step 506. The switch then generates an Info__Analyzed query message that is transmitted to the SCP 27 in step 508. In step 510, the SCP receives the Info__Analyzed message and allocates a portion of memory to open the transaction. In step 512, the SCP and the switch preferably exchange a series of bi-directional conversation messages that involve the calling party in an interactive communication set up process. The SCP thereby obtains identification information from the calling party including the account code corresponding to the calling party's prepaid telephone card, the PIN, and the directory number of the called station 20.

In step 514, the SCP determines the allowed duration for a connection between the originating station 18 and the called station 20. The allowed duration is preferably compared to a threshold value. If the allowed duration is less than the threshold value, typically one minute, the SCP generates an error response message (not shown) that causes the transaction to be closed and the communication to be disconnected. If the allowed duration is greater than the threshold value, the SCP generates an Analyze__Route response message that includes a CallTimer parameter and a Send__Notification instruction. The allowed duration is included in the Analyze__Route message as the CallTimer parameter. The SCP also generates a random number that is used as a communication ID. The communication ID is included in the Echo__Data field of the Send__Notification instruction. The SCP transmits the Analyze__Route response message to the switch in step 516. In step 518, the SCP closes the transaction opened by the Info__Analyzed query message. Closing the transaction at the SCP frees the memory allocated to the transaction by the SCP. In step 520, the SSP 12a receives the Analyze__Route response message that causes the switch to store the communication ID and close the transaction. Closing the transaction at the SSP frees the memory allocated to the transaction by the SSP.

In step 522, the SSP 12a preferably sets a timer to the allowed duration minus one minute. In step 524, the SSP routes the communication to the terminating SSP 12b for connection with the called station 20. If the communication is connected, the terminating SSP 12b sends a message informing the originating SSP 12a of the connection, as shown in step 526. The originating SSP 12a begins decrementing the timer in step 528. If the connection has not been disconnected, the SSP plays a warning signal upon expiration of the timer in step 530. The originating SSP then resets the timer to one minute in step 532. If the connection has not been disconnected when the timer again expires, the SSP disconnects the communication in step 534.

Upon disconnection, the switch 12a preferably generates a Unidirectional Termination__Notification message including the measured duration of the connection between the originating station 18 and the called station 20. The Termination__Notification message preferably includes the communication ID. The Termination__Notification message is sent to the SCP in step 536. In step 538, the SCP uses the communication ID to access the account corresponding to the calling party's prepaid telephone card. The SCP then computes the cost of the communication and deducts the cost from the balance in the account.

Figure 6:
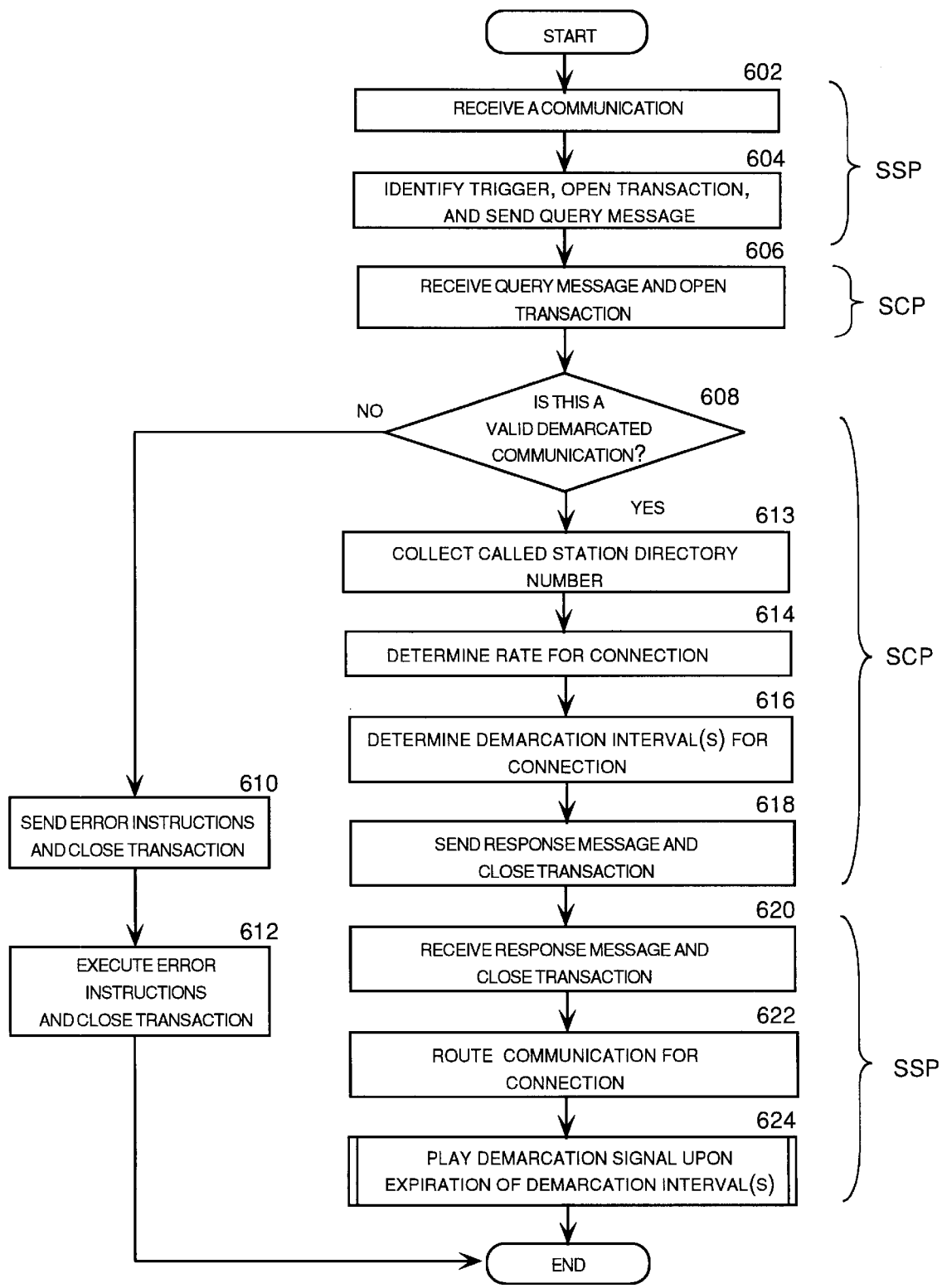
FIG. 6 is a logic flow diagram that illustrates a preferred method for implementing a subscription based demarcated telephone service.
Figure 7:
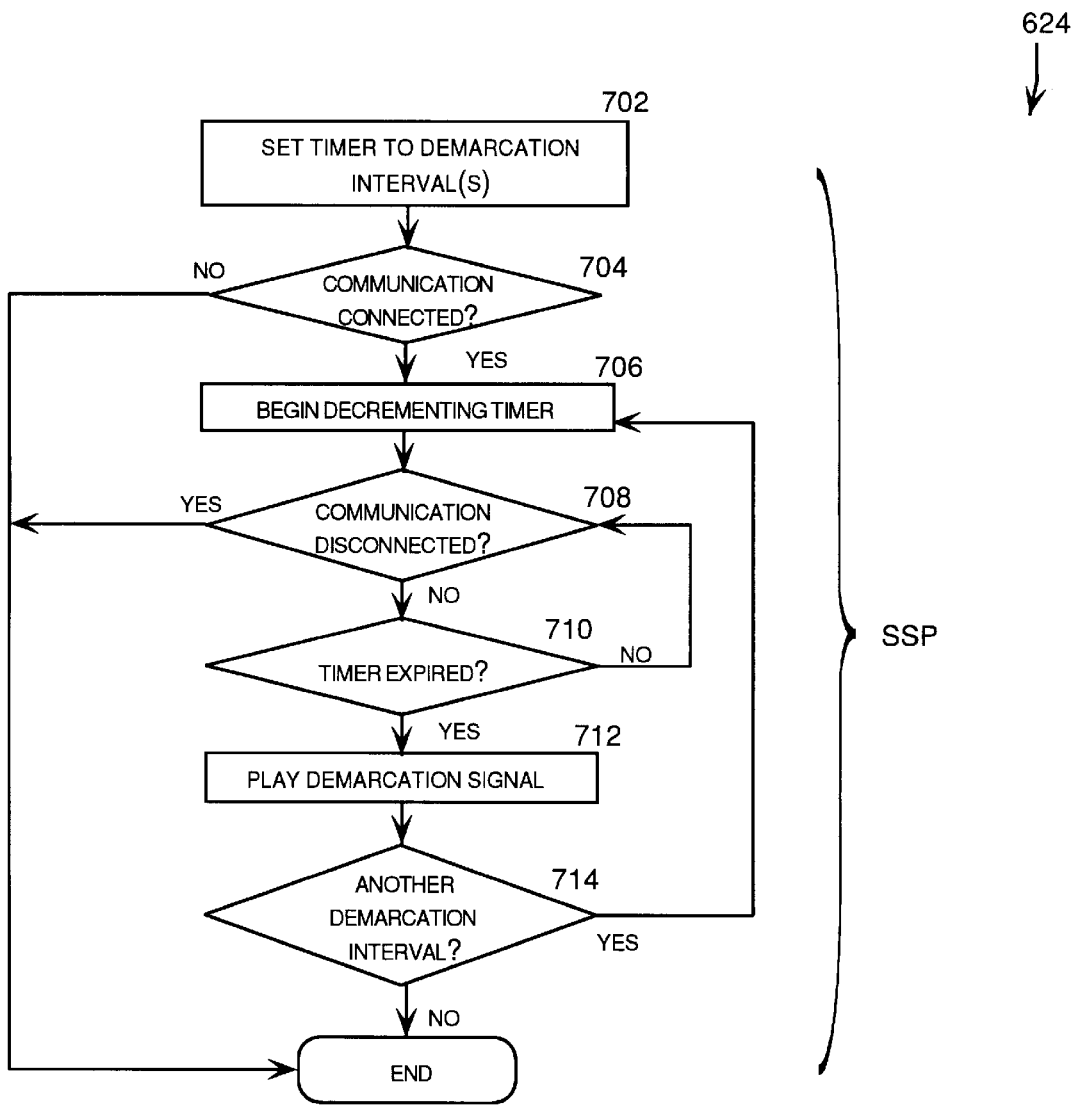
FIG. 7 is a logic flow diagram that illustrates a preferred method for playing a demarcation signal upon the expiration of a demarcation interval.

A Second Preferred Embodiment: A Demarcated Telephone Service Using a Customer Profile FIGS. 6–7 provide a logic flow diagram, and FIG. 8 provides a message sequence diagram, that illustrates a preferred method for implementing a subscription based demarcated telephone service. The preferred method illustrated by FIGS. 6–8 allows a calling party to obtain demarcated communication services in accordance with a demarcation scheme defined in a demarcated communication service profile established by a subscriber. The preferred method illustrated by FIGS. 6–8 is considered appropriate for demarcated telephone services that are generally available on a subscription basis. A subscriber of such a service sets up a demarcated communication service profile in advance of receiving demarcated communication services. Therefore, an interactive communication set up process is not required to place demarcated communications. Specifying a demarcation scheme in demarcated communication service profile avoids needless delay in connecting a subscriber's communications, and minimizes the time during which the SCP must maintain an open transaction for the communication. Preferably, a subscriber may set up a demarcated communication service profile through touch-tone commands directed to an intelligent platform such as the SMS 40, or through any other means of communicating the subscriber's desires to the telephone service provider.

Preferably, a calling party initiates a demarcated communication by placing a conventional telephone call from the originating station 18. Nothing more than the steps associated with placing a conventional telephone call is required because the demarcated communication services are automatically provided to each communication originating from a station associated with a subscriber's line or mobile cellular radiotelephone. In other words, the demarcated communication services are associated with the originating station directory number. Demarcated telephone services may equivalently be associated with a different piece of identification information such as a subscriber's account code. Such a modification to the preferred method illustrated by FIGS. 6–8 would allow the calling party to obtain demarcated telephone services for communications originating from stations other than those associated with a subscriber's line or cellular mobile radiotelephone. Such a modification to the preferred method illustrated by FIGS. 6–8 is within the scope and spirit of the present invention.

As described above, the originating station directory number may be used to trigger demarcated communication services. Using the originating station directory number to trigger demarcated communication services is appropriate if the demarcated communication service are to apply generally to communications originating from stations associated with a subscriber's line or cellular mobile radiotelephone. Equivalently, the calling party may be required to input a trigger code such as "*xx" to activate the demarcated communication services on a per-communication basis. Such a modification to the preferred method illustrated by FIGS. 6–8 would allow the calling party to selectively obtain demarcated telephone services for communications originating from stations associated with a subscriber's line or cellular mobile radiotelephone. Alternatively, a code such as "*xx" may be used to override a generally applicable demarcated communication service. It will also be appreciated that demarcated communication services may be provided only to communications placed to certain specified directory numbers or area codes. Alternatively, certain specified directory numbers or area codes may be excluded from a generally applicable demarcated communication service. Such modifications to the preferred method illustrated by FIGS. 6–8 are within the scope and spirit of the present invention.

The preferred method illustrated by FIG. 6 begins with step 602 in which the originating SSP 12a receives a communication from the originating station 18 on the voice channel line 14c. The communication received by the switch includes identification information including a trigger that is recognized by the switch in step 604. In response to the trigger, the switch holds the communication and generates an Info_Analyzed query message that is sent to the SCP 27 over the data link network 26 via the STP 24.

The Info_Analyzed query message generated by the switch 12a preferably opens a transaction for which the switch allocates a portion of memory. In step 606, the SCP 27 receives the Info_Analyzed query message and allocates a portion of memory to open the transaction at the SCP. The memory allocated by the SSP and the SCP for the transaction remains occupied until the SCP transmits a response that closes the transaction. In decision step 608, it is determined whether the calling party has requested a valid demarcated communication. If the calling party has not requested a valid demarcated communication, the "NO" branch is followed from step 608 to step 610 in which the SCP 27 generates a response message including error instructions that are transmitted to the SSP 12a. In step 612, the error response message causes the transaction to be closed and the communication to be automatically disconnected.

If the calling party requests a valid demarcated communication, the "YES" branch is preferably followed from step 608 to step 613 in which the called station's directory number is collected from the originating party. Step 613 is followed by step 614 in which the SCP 27 determines a rate for the communication in a conventional manner. It will be appreciated that step 614 is required only if the demarcated communication is to be cost demarcated; if the demarcated communication is to be duration demarcated, step 614 may be omitted. In step 616, the SCP obtains the demarcation cost parameters from the subscriber's demarcated communication service profile and uses the rate for the communication and the demarcation cost parameters to determine demarcation intervals that correspond to the demarcation cost parameters.

In step 618, the SCP 27 generates an Analyze_Route response message that is preferably transmitted to the SSP 12a. The demarcation intervals are included in the CallTimer parameter of the of the Analyze_Route response message. The SCP then closes the transaction and thereby frees the memory allocated by the SCP to transaction. In step 620, the SSP 12a receives the Analyze_Route response message. In response to receipt of the Analyze_Route message, the switch closes the transaction and thereby frees memory allocated by the switch to the transaction. In step 622, the switch routes the communication for connection with the called station 20. In routine 624, the switch implements the demarcated telephone service specified in the subscriber's demarcated communication service profile. After routine 624, the preferred method illustrated by FIG. 6 is at an end.

FIG. 7 is a logic flow diagram that illustrates a preferred method for playing a demarcation signal upon the expiration of a demarcation interval. FIG. 7 illustrates the steps of routine 624 from FIG. 6. In step 702, the SSP 12a sets one or more timers to the demarcation intervals received as the CallTimer parameter of the Analyze_Route response message. In decision step 704, it is determined whether the communication is connected between the originating station 18 and the called station 20. If the communication is not connected, the "NO" branch is followed and the preferred method illustrated by FIG. 7 is at an end. If the communication is connected, the "YES" branch is followed from step 704 to step 706 in which the timer begins decrementing. Step 706 is followed by decision step 708 in which it is determined whether the communication has been disconnected. If the communication has been disconnected, the preferred method illustrated by FIG. 7 is at an end. If the communication has not been disconnected, the "NO" branch is followed to step 710 in which it is determined whether the timer has expired.

If the timer has not expired, the "NO" branch is preferably followed from decision step 710 back to decision step 708. Routine 624 remains in the loop between decision steps 710 and 708 until the timer expires or the communication is disconnected. If the timer expires, the "YES" branch is followed from step 710 to step 712 in which a demarcation signal is played. The demarcation signal may preferably be a beep or a short message such as "one dollar." In decision step 714, it is determined whether there is another demarcation interval. If there is another demarcation interval, the "YES" branch is followed from decision step 714 back to step 706, and steps 706 through 714 are repeated. If there is not another demarcation interval, the "NO" branch is followed, and the preferred method illustrated by FIG. 7 is at an end.

FIG. 8 is a message flow diagram illustrating a preferred method for implementing a subscription based demarcated telephone service. The preferred method illustrated by FIG. 8 is the same as that illustrated by the logic flow diagrams of FIGS. 6–7. FIGS. 6–7 show the preferred method as an integrated logic flow diagram that involves processing steps performed by various the elements of the AIN 11. FIG. 8 more clearly illustrates the flow of messages amongst the elements of the AIN. The dashed lines shown in FIG. 8 indicate messages that are transmitted over the data link network 26. An arrows on a dashed line indicate the direction in which a message flows.

In step 802, the originating SSP 12a preferably receives a communication from the originating station 18. The switch identifies a trigger in step 804, holds the communication, and allocates a portion of memory required to open a transaction in step 806. The switch then generates an Info_Analyzed query message that is transmitted to the SCP 27 in step 808. In step 810, the SCP receives the Info_Analyzed message and allocates a portion of memory to open the transaction. In this embodiment of the present invention, the SCP and the switch do not engage in a further series of bi-directional conversation messages that involve the calling party in an interactive communication set up process. Rather, the SCP obtains all of the identification information required to set up the communication in the initial triggering input sequence received from the calling party.

In step 812, the SCP preferably determines the demarcation intervals for the requested connection. The SCP then generates an Analyze_Route response message that includes CallTimer parameter. The demarcation intervals are included in the Analyze_Route message as the CallTimer parameter. The SCP transmits the Analyze_Route response message to the switch in step 814. In step 816, the SCP closes the transaction opened by the Info_Analyzed query message and thereby frees the memory allocated by the SCP to the transaction. In step 818, the SSP 12*a* receives the Analyze_Route response message. The SSP then closes the transaction opened by the Info_Analyzed query message and thereby frees the memory allocated by the SSP to the transaction. In step 820, the SSP 12*a* sets one or more timers to the demarcation intervals and, in step 822, routes the communication to the terminating SSP 12*b* for connection with the called station 20. If the communication is connected, the terminating SSP 12*b* sends a message informing the originating SSP 12*a* of the connection in step 824. The switch then begins decrementing the timer in step 826. If the connection has not been disconnected, the switch plays a demarcation signal upon expiration of the timer in step 828. A demarcation signal is played for each demarcation interval specified in the CallTimer parameter.

It should be understood that the foregoing relates only to the preferred embodiment of the present invention, and that numerous changes may be made therein without departing from the spirit and scope of the invention as defined by the following claims.

What is claimed is:

1. In an intelligent switched telecommunications network including a first network element, a second network element, and a data link functionally connecting said first network element and said second network element, a method for implementing service functions in association with a communication between an originating station and a called station, comprising the steps of:

receiving said communication at said first network element from said originating station, said communication including identification information;

opening a transaction for use in a bi-directional exchange of messages relating to said communication between said first network element and said second network element;

holding said communication at said first network element while sending said identification information via said data link from said first network element to said second network element;

determining at said second network element processing instructions for implementing said service functions;

sending a processing message via said data link from said second network element to said first network element, said processing message including said processing instructions;

closing said transaction; and after closing said transaction and in response to receiving said processing message, causing said first network element
  to route said communication for connection from said originating station to said called station, and
  to implement said service functions in accordance with said processing instructions.

2. In an intelligent switched telecommunications network including a first network element, a second network element, and a data link functionally connecting said first network element and said second network element, a method for charging the cost of a communication from an originating station to a called station to a prepaid account, comprising the steps of:

receiving a communication at said first network element, said communication including identification information;

opening a transaction for use in a bi-directional exchange of messages relating to said communication between said first network element and said second network element;

holding said communication at said first network element while sending said identification information via said data link from said first network element to said second network element;

determining at said second network element that the cost of said communication is to be charged to a prepaid account, said prepaid account being identified based on said identification information;

sending a processing message via said data link from said second network element to said first network element;

closing said transaction; and after closing said transaction and in response to receiving said processing message, causing said first network element to route said communication for connection from said originating station to said called station;

measuring the duration of said communication so as to provide said first network element a measured duration of said communication from said connection of said communication to the disconnection of said communication between said originating station and said called station;

providing said measured duration of said communication via said data link from said first network element to said second network element; and causing said second network element
  to determine said cost of said communication based on said measured duration of said communication, and
  to debit said cost of said communication against said prepaid account.

3. In an intelligent switched telecommunications network including a first network element, a second network element, and a data link functionally connecting said first network element and said second network element, a method for providing a communication from an originating station to a called station, said communication being of an allowed duration based on a prepaid balance in an account and the cost of said communication being charged to said account, comprising the steps of:

receiving a communication at said first network element, said communication including identification information;

opening a transaction for use in a bi-directional exchange of messages relating to said communication between said first network element and said second network element;

holding said communication at said first network element while sending said identification information via said data link from said first network element to said second network element;

determining at said second network element said allowed duration of said communication based on said identification information and said prepaid balance in said account, and determining the cost of said communication of said allowed duration;

sending a processing message via said data link from said second network element to said first network element;

closing said transaction:

after closing said transaction and in response to receiving said processing message, causing said first network element
  to route said communication for connection from said originating station to said called station;
  to effect measurement of the duration of said communication beginning with said connection of said communication until the expiration of said allowed duration, and upon expiration of said allowed duration of said communication, to effect the disconnection of said communication; and causing said second network element to debit said cost of said communication against said prepaid account.

4. In an intelligent switched telephone network including a first network element, a second network element, and a data link functionally connecting said first network element and said second network element, a method for providing a demarcated voice channel communication between an originating station and a called station, comprising the steps of:

receiving a communication at said first network element from said originating station, said communication having identification information associated therewith including a request that said communication be processed as said demarcated voice channel communication;

opening a transaction for use in a bi-directional exchange of messages relating to said communication between said first network element and said second network element:

causing said first network element to hold said communication at said first network element pending receipt of a message relating to said communication from said second network element;

causing said second network element
to determine a demarcation interval for said communication, and
to provide a demarcation message to said first network element, said demarcation message including said demarcation interval;

closing said transaction: and after closing said transaction and in response to receiving said demarcation message, causing said first network element
to route said communication for connection to said called station, and
to play a demarcation signal to said communication upon expiration of said demarcation interval.

5. The method of claim 4, wherein said demarcation interval is a first demarcation interval and said demarcation signal is a first demarcation signal, further comprising the steps of:

causing said second network element
to determine a second demarcation interval for said communication, and
to provide said demarcation message to said first network element, said demarcation message including said second demarcation interval; and after said step of causing said first network element to route said communication for connection to said called station, causing said first network element to play a second demarcation signal upon expiration of said second demarcation interval.

6. The method of claim 4, after said step of causing said first network element to hold said communication, further comprising the step of causing said first network element to provide said identification information via said data link to said second network element.

7. The method of claim 6, wherein said step of causing said second network element to determine said demarcation interval comprises causing said second network element to determine said demarcation interval based on subscriber information relating to said originating station, said subscriber information being accessed through said identification information.

8. The method of claim 7, wherein said step of causing said second network element to determine said demarcation interval based on said subscriber information comprises causing said second network element to select a predefined duration as said demarcation interval from said subscriber information.

9. The method of claim 4, wherein said step of causing said second network element to determine said demarcation interval comprises causing said second network element to determine said demarcation interval based on a monetary rate for said communication as calculated using said identification information.

10. The method of claim 4, after said step of causing said first network element to play said demarcation signal, further comprising the step of causing said first network element to effect the disconnection of said communication.

11. The method of claim 4, further comprising the steps of:

after said step of causing said first network element to route said communication, causing said first network element to measure the duration of said communication and to provide via said data link said second network element with the measured duration of said communication; and in response to receiving said measured duration of said communication, causing said second network element
to determine a cost for said communication based on said measured duration, and
to deduct said cost from a prepaid balance in an account associated with said originating station.

12. In an intelligent switched telecommunications network including a first network element, a second network element, and a data link functionally connecting said first network element and said second network element, a method for providing a communication of an allowed duration between an originating station and a called station, comprising the steps of:

receiving a communication at said first network element from said originating station, said communication having identification having identification information associated therewith including a request that said communication be processed as said allowed duration communication;

causing said first network element to hold said communication at said first network element pending receipt of a message relating to said communication from said second network element;

opening a transaction for use in a bi-directional exchange of messages relating to said communication between said first network element and said second network element;

causing said first network element to provide said identification information via said data link to said second network element;

causing said second network element
to determine an allowed duration for said communication, and
to provide an allowed duration message to said first network element, said allowed duration message including said allowed duration;

closing said transaction; and after closing said transaction and in response to receiving said allowed duration message, causing said first network element to route said communication for connection to said called station, and to effect the disconnection of said communication at the expiration of said allowed duration.

13. The method of claim 12, wherein said step of causing said second network element to determine said allowed duration comprises causing said second network element to determine said allowed duration based on a monetary rate for said communication as calculated using said identification information.

14. The method of claim 12, wherein said step of causing said second network element to determine said allowed duration comprises causing said second network element to determine said allowed duration based on subscriber information relating to said originating station, said subscriber information being maintained at said second network element and being accessed through said identification information.

15. The method of claim 14, wherein said step of causing said second network element to determine said allowed duration based on said subscriber information comprises causing said second network element to select a predefined duration as said allowed duration from said subscriber information.

16. The method of claim 14, wherein said step of causing said second network element to determine said allowed duration based on said subscriber information comprises causing said second network element to determine said allowed duration based on a prepaid monetary balance in an account associated with said originating station.

17. The method of claim 12, further comprising the steps of:

causing said second network element
to determine a warning interval based on said allowed duration, and
to provide a warning interval message to said first network element, said warning interval message including said warning interval; and after said step of causing said first network element to route said communication, and before said step of causing said first network element to effect said disconnection of said communication, causing said first network element to play a warning upon the expiration of said warning interval.

18. The method of claim 12, further comprising the steps of:

after said step of causing said first network element to route said communication, causing said first network element to measure the duration of said communication and to provide via said data link said second network element with said measured duration of said communication; and in response to receiving the measured duration of said communication, causing said second network element
to determine a cost for said communication based on said measured duration, and
to deduct said cost from a prepaid balance in an account associated with said originating station.

19. In an intelligent switched telecommunications network including a switch, a service control point, and a data link functionally connecting said switch and said service control point, a method for providing a demarcated voice channel communication of an allowed duration between an originating station and a called station, comprising the steps of:

receiving a communication at said switch from said originating station, said communication having identification information associated therewith including a request that said communication be processed as said demarcated voice channel communication;

opening a transaction for use in a bi-directional exchange of messages relating to said communication between said first network element and said second network element;

causing said switch to hold said communication at said switch pending receipt of a message relating to said communication from said service control point;

causing said switch to provide said identification information via said data link to said service control point;

causing said service control point
to determine a demarcation interval for said communication, said demarcation interval being based on subscriber information relating to said originating station, said subscriber information being accessed through said identification information,
to determine an allowed duration for said communication, said allowed duration being based on a monetary rate for said communication and a prepaid balance in an account associated with said subscriber information,
to provide a demarcation message to said switch, said demarcation message including said demarcation interval, and
to provide an allowed duration message to said switch, said allowed duration message including said allowed duration;

in response to receiving said demarcation message and said allowed duration message, causing said switch to set a timer
to said demarcation interval,
to a warning interval, and
to said allowed duration;
also causing said switch to close said transaction, and after closing said transaction
to route said communication for connection to said called station,
to measure the duration of said communication by decrementing said timer upon connection of said communication,
to play a demarcation signal upon expiration of said demarcation interval,
to play a warning signal upon expiration of said warning interval, and
to effect the disconnection of said communication upon expiration of said allowed duration;

after said disconnection of said communication, causing said switch to provide via said data link said service control point with the measured duration of said communication; and in response to receiving said measured duration of said communication, causing said service control point
to determine a cost for said communication, and
to deduct said cost from said prepaid balance in said account associated with said subscriber information.

* * * * *